US012517620B2

(12) United States Patent
Park et al.

(10) Patent No.: US 12,517,620 B2
(45) Date of Patent: Jan. 6, 2026

(54) ELECTRONIC DEVICE COMPRISING DIGITIZER AND OPERATING METHOD THEREFOR

(71) Applicant: SAMSUNG ELECTRONICS CO., LTD., Suwon-si (KR)

(72) Inventors: Jaehwan Park, Suwon-si (KR); Jungchul An, Suwon-si (KR); Sangil Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 18/750,690

(22) Filed: Jun. 21, 2024

(65) Prior Publication Data
US 2024/0345692 A1 Oct. 17, 2024

Related U.S. Application Data

(63) Continuation of application No. PCT/KR2022/019870, filed on Dec. 8, 2022.

(30) Foreign Application Priority Data

Dec. 21, 2021 (KR) .................. 10-2021-0183569
Mar. 23, 2022 (KR) .................. 10-2022-0036194

(51) Int. Cl.
G06F 3/046 (2006.01)
G06F 1/16 (2006.01)
(Continued)

(52) U.S. Cl.
CPC ............ G06F 3/046 (2013.01); G06F 1/1643 (2013.01); G06F 3/0416 (2013.01);
(Continued)

(58) Field of Classification Search
CPC ........ G06F 1/16; G06F 1/1616; G06F 1/1618; G06F 1/1641; G06F 1/1643;
(Continued)

(56) References Cited

U.S. PATENT DOCUMENTS

2004/0189887 A1 9/2004 You et al.
2012/0169642 A1 7/2012 Lee
(Continued)

FOREIGN PATENT DOCUMENTS

KR 20040084464 A 10/2004
KR 20120079598 A 7/2012
(Continued)

OTHER PUBLICATIONS

Extended European Search Report dated Feb. 20, 2025 for EP Application No. 22911701.5.
(Continued)

Primary Examiner — Julie Anne Watko
(74) Attorney, Agent, or Firm — Nixon & Vanderhye P.C.

(57) ABSTRACT

An electronic device may include: a first housing; a second housing that is foldably coupled to the first housing through a hinge device; a display; a digitizer disposed under the display; a first printed circuit board electrically connected to the digitizer; a second printed circuit board electrically connected to the digitizer; a third FPCB structure electrically connecting the first printed circuit board and the second printed circuit board; and a processor that detects the coordinates of an electronic pen. The digitizer may include a first electro magnetic resonance (EMR) sheet with a first flexible printed circuit board (FPCB) structure and a second EMR sheet with a second FPCB structure. The digitizer may include a plurality of x-axis channels and a plurality of y-axis channels orthogonal to the plurality of x-axis channels, and the plurality of x-axis channels may include single
(Continued)

channels formed of single wires and common channels formed of common wires. A method of operating an electronic device determines a position of an electronic pen.

20 Claims, 19 Drawing Sheets

(51) Int. Cl.
    *G06F 1/18* (2006.01)
    *G06F 3/041* (2006.01)
    *H05K 1/02* (2006.01)
    *H05K 1/14* (2006.01)
(52) U.S. Cl.
    CPC ............ *H05K 1/0277* (2013.01); *H05K 1/14* (2013.01); *G06F 1/1616* (2013.01)
(58) Field of Classification Search
    CPC .... G06F 1/1647; G06F 1/1681; G06F 3/0416; G06F 3/046; G06F 2203/04102; H05K 1/0277; H05K 1/14
    See application file for complete search history.

(56) References Cited

U.S. PATENT DOCUMENTS

| | | |
|---|---|---|
| 2015/0220192 A1 | 8/2015 | Jeon et al. |
| 2015/0261326 A1 | 9/2015 | Kim et al. |
| 2016/0041666 A1 | 2/2016 | Lee et al. |
| 2018/0246608 A1 | 8/2018 | Huh et al. |
| 2020/0236826 A1 | 7/2020 | Baek et al. |
| 2020/0333836 A1 | 10/2020 | Kim et al. |
| 2021/0173437 A1 | 6/2021 | Bae et al. |
| 2021/0247806 A1 | 8/2021 | Lee et al. |
| 2021/0333944 A1 | 10/2021 | Jung |

FOREIGN PATENT DOCUMENTS

| | | |
|---|---|---|
| KR | 20150054489 A | 5/2015 |
| KR | 101681806 B1 | 12/2016 |
| KR | 20180099230 A | 9/2018 |
| KR | 20180127705 A | 11/2018 |
| KR | 20190024493 A | 3/2019 |
| KR | 20200122688 A | 10/2020 |
| KR | 102179005 B1 | 11/2020 |
| KR | 20210077179 A | 6/2021 |
| KR | 20210097650 A | 8/2021 |
| KR | 20210150942 A | 12/2021 |
| KR | 20210152910 A | 12/2021 |
| KR | 10-2023-0094928 A * | 6/2023 |
| WO | 2022182012 A1 | 9/2022 |

OTHER PUBLICATIONS

International Search Report dated Feb. 27, 2023 issued in PCT International Application No. PCT/KR2022/019870 and English translation, 5 pages.

Written Opinion dated Feb. 27, 2023 issued in PCT International Application No. PCT/KR2022/019870 and English translation, 8 pages.

* cited by examiner

FIG. 8
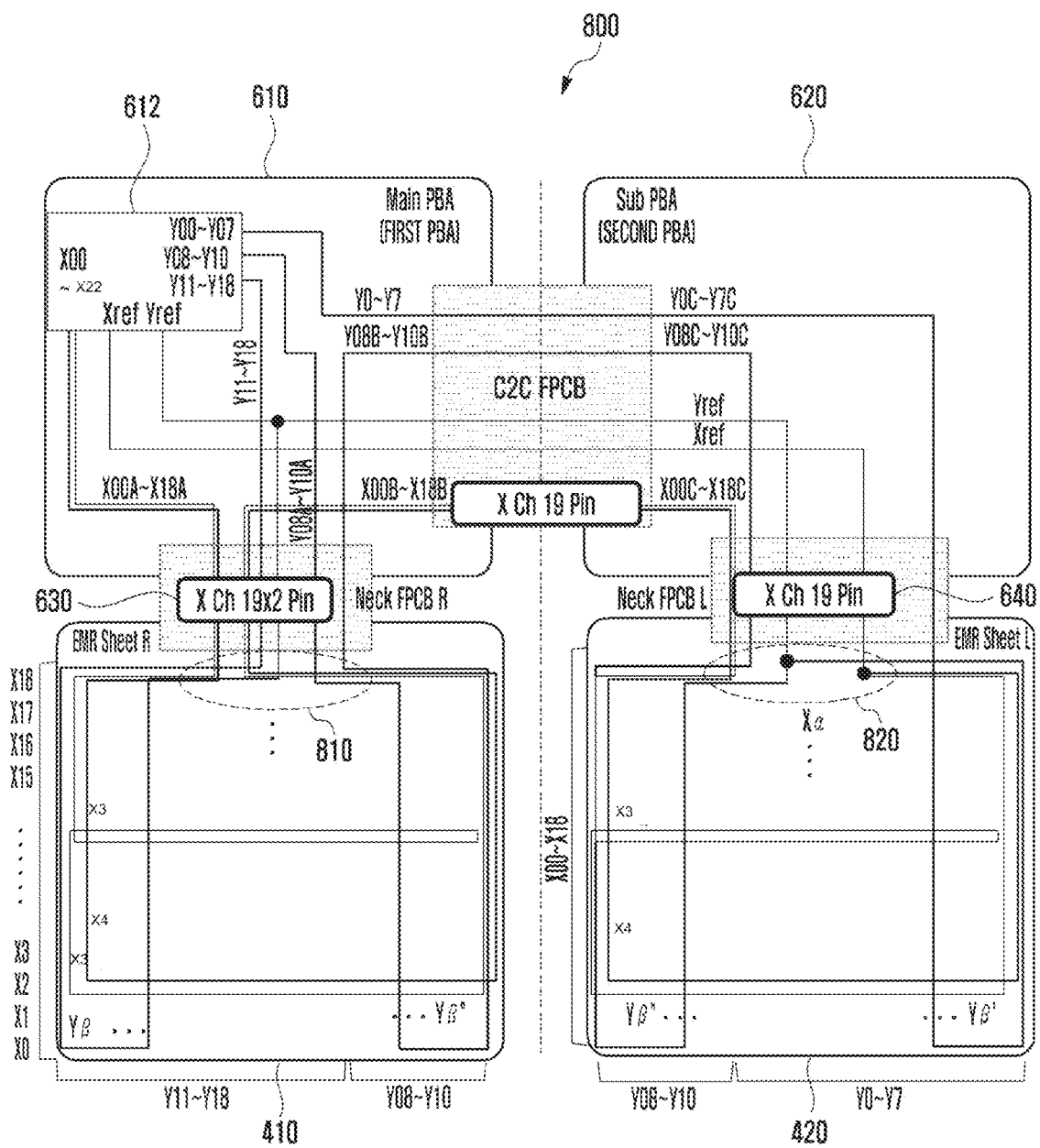
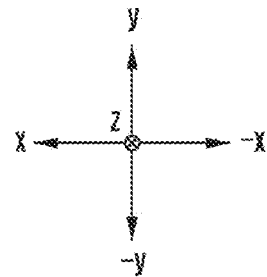

ELECTRONIC DEVICE COMPRISING DIGITIZER AND OPERATING METHOD THEREFOR

CROSS-REFERENCE TO RELATED APPLICATIONS

This application is a continuation application of International Application No. PCT/KR2022/019870 filed on Dec. 8, 2022, designating the United States, and claiming priority to Korean Patent Application No. 10-2021-0183569, filed on Dec. 21, 2021, and Korean Patent Application No. 10-2022-0036194, filed on Mar. 23, 2022, in the Korean Intellectual Property Office, the disclosures of which are all hereby incorporated by reference herein in their entireties.

BACKGROUND

Technical Field

Certain example embodiments relate to an electronic device including a digitizer and/or a method of operating the same.

Description of Related Art

Electronic devices have become thinner, lightweight, small-scale, and multifunctional. To this end, displays and various components are disposed in the electronic devices. With the development of display technologies, developments are being conducted on electronic devices including flexible or foldable displays. Flexible (or foldable) displays, which may be folded, bent, rolled, or unfolded, are expected to contribute to reducing the volumes of electronic devices and changing the designs of electronic devices. The flexible (or foldable) display may be included in the electronic device, and a digitizer for converting analog coordinates of an electronic pen (e.g., stylus pen or stylus) into digital data may be disposed below the flexible (or foldable) display.

The information is provided only as background information for assisting in understanding the present disclosure. There has been no determination and no claim is made as to whether any of the above information is applicable as prior art with respect to the present disclosure.

SUMMARY

A digitizer, which may include two electromagnetic resonance (EMR) sheets (or EMR films) separated in a leftward/rightward direction (or upward/downward direction), may be disposed below a foldable display. In each of the two EMR sheets (e.g., a right EMR sheet and a left EMR sheet), lines, which constitute x-axis (e.g., horizontal axis) channels, and lines, which constitute y-axis (e.g., vertical axis) channels, may be disposed to be orthogonal to one another. The right EMR sheet may be electrically connected to a first printed circuit board (e.g., a first printed board assembly (PBA)) through a first FPCB structure (e.g., a right neck flexible printed circuit board (FPCB) and a connector). The left EMR sheet may be electrically connected to a second printed circuit board (e.g., a second PBA) through a second FPCB structure (a left neck FPCB and a connector). The right EMR sheet and the left EMR sheet may be electrically connected through a third FPCB structure (e.g., a C2C FPCB and a connector). The number of lines may increase by the number of x-axis channels disposed on the right EMR sheet and the left EMR sheet, and the number of pins of connectors of the first FPCB structure, the second FPCB structure, and the third FPCB structure may increase. For this reason, the physical sizes of the FPCBs and the connectors may increase, and the FPCBs having large areas push the displays upward in a z-axis direction, which may degrade the surface quality of the displays. Various example embodiments may provide an electronic device including a digitizer and a method of operating the same, in which the number of lines, which define x-axis channels on a right EMR sheet and a left EMR sheet of a digitizer, may be reduced, such that physical sizes of FPCBs and connectors may be reduced.

Technical problems to be solved are not limited to the above-mentioned technical problems, and other technical problems, which are not mentioned above, may be clearly understood from the following descriptions by those skilled in the art.

An electronic device according to various example embodiments may include a first housing, a second housing foldably coupled to the first housing via at least a hinge device, a display disposed to be supported by the first housing and the second housing, a digitizer disposed below the display, a first printed circuit board disposed in a first internal space of the first housing and electrically connected, directly or indirectly, to the digitizer, a second printed circuit board disposed in a second internal space of the second housing and electrically connected, directly or indirectly, to the digitizer, a third FPCB structure configured to electrically connect the first printed circuit board and the second printed circuit board, and a processor, comprising processing circuitry, configured to detect a coordinate of an electronic pen (e.g., stylus) adjacent to the digitizer. The digitizer may include a first electromagnetic resonance (EMR) sheet disposed in the first internal space of the first housing and including a first flexible printed circuit board (FPCB) structure, and a second EMR sheet disposed in the internal space of the second housing and including a second FPCB structure. The digitizer may include a plurality of x-axis channels and a plurality of y-axis channels orthogonal to the plurality of x-axis channels, and the plurality of x-axis channels may include single channels formed as single lines and common channels formed as common lines.

Additional aspects will be described in part in the following description, in part as will be apparent from the description, or as may be understood by practicing the presented example embodiments.

A method of operating an electronic device according to various example embodiments may comprise a method of operating an electronic device including a digitizer, the digitizer may include a plurality of x-axis channels and a plurality of y-axis channels orthogonal to the plurality of x-axis channels, and the plurality of x-axis channels may include single channels formed as single lines and common channels formed as common lines. First electromagnetic resonance (EMR) signals of three first x-axis channels disposed at a first position may be received. Second EMR signals of three second x-axis channels disposed at a second position may be received. The x-axis channels of the first EMR signals and the second EMR signals may be compared, and a position, at which an electronic pen (e.g., stylus) is adjacent to the digitizer, may be determined.

According to the electronic device including the digitizer according to various example embodiments, it is possible to reduce the number of lines for forming the x-axis channels of the right EMR sheet and the left EMR sheet of the digitizer, thereby reducing the physical sizes of the FPCBs.

In addition, it is possible to reduce the physical sizes of the connectors by reducing the number of pins of the connectors.

According to the electronic device including the digitizer according to various example embodiments, it is possible to reduce the physical size of the FPCBs electrically connected to the digitizer and reduce the pressure applied by the FPCBs to push the display upward in the z-axis direction, thereby improving the surface quality of the display.

Other aspects, advantages, and distinctive features of the present disclosure will be apparent to those skilled in the art from the following detailed description that discloses various example embodiments taken with reference to the accompanying drawings.

BRIEF DESCRIPTION OF DRAWINGS

Particular example embodiments, other aspects, features, and advantages of the present disclosure will be more apparent from the following description taken with reference to the accompanying drawings.

FIG. 8 is a view illustrating connection structures of a first printed circuit board, a second printed circuit board, a first EMR sheet, and a second EMR sheet of the electronic device according to various example embodiments.

Throughout the drawings, like reference numerals will be understood to refer to like parts, components, and structures.

DETAILED DESCRIPTION

The following description with reference to the accompanying drawings is provided to assist in a comprehensive understanding of various example embodiments defined by the claims and equivalents thereof. Various particular details are contained herein to assist in understanding, but should be considered illustrative only. Accordingly, it should be noted that various embodiments disclosed in the present specification may be variously changed and modified by those skilled in the art without departing from the scope and spirit of the present disclosure. In addition, the descriptions of well-known functions and configurations may be omitted for clarity and brevity.

The terms and words used in the following descriptions and claims are not limited to the literary meanings thereof, but are merely used by the inventors to enable a clear and consistent understanding of the present disclosure. Accordingly, it should be apparent to those skilled in the art that the following description of various example embodiments is not intended to limit the present disclosure defined by the appended claims and equivalents thereof, but is provided for illustrative purposes only.

Expressions in singular form should be understood to include plural referents unless the context clearly implies otherwise. Therefore, for example, a reference to "component surfaces" includes a reference to one or more such surfaces.

Figure 1:
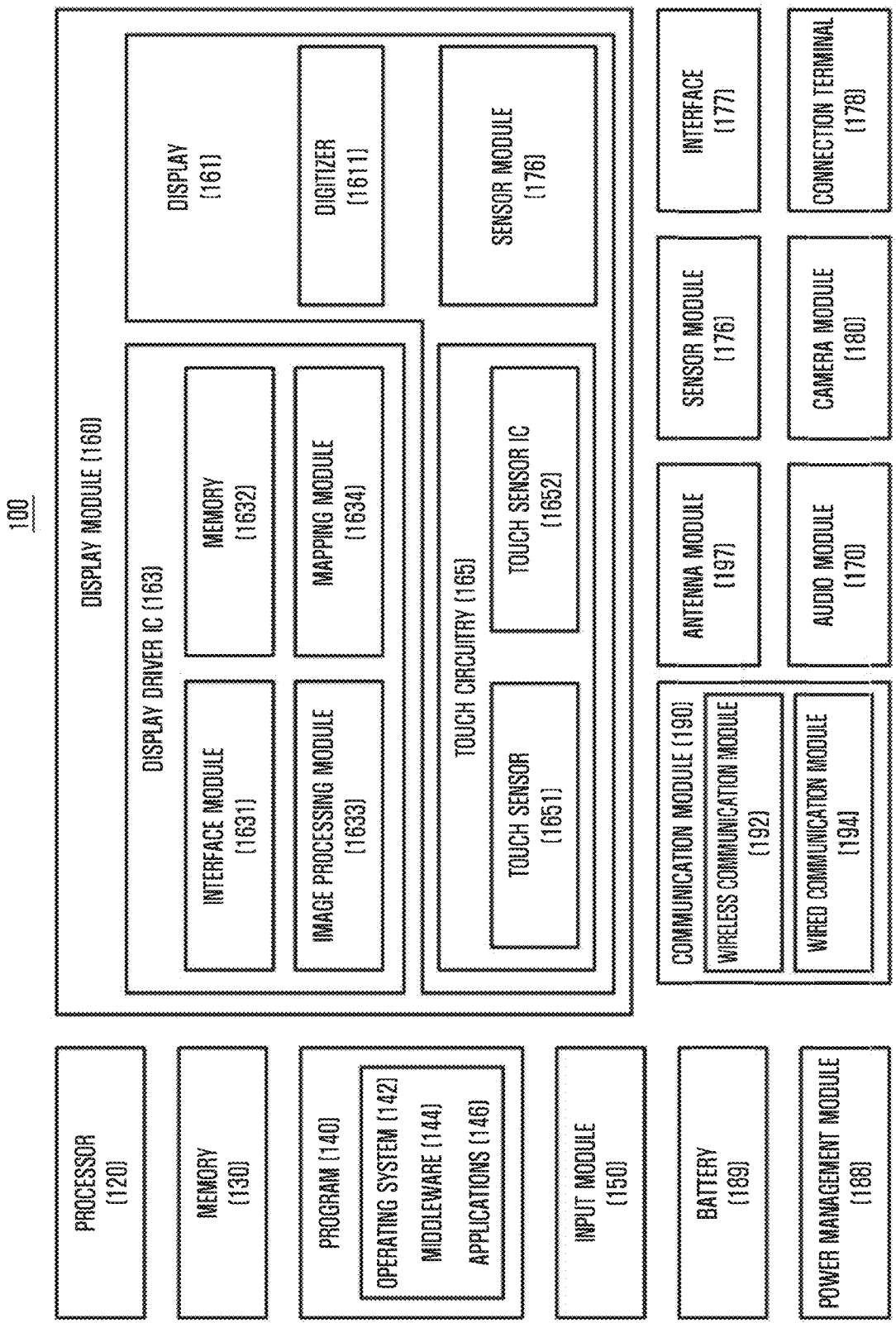
FIG. 1 is a block diagram of an electronic device according to various example embodiments.

FIG. 1 is a block diagram illustrating an electronic device 100 in a network environment 100 according to various embodiments.

Referring to FIG. 1, the electronic device 100 in the network environment 100 may communicate with an another electronic device via a first network (e.g., a short-range wireless communication network), or at least one of an electronic device or a server via a second network (e.g., a long-range wireless communication network).

According to an embodiment, the electronic device 100 may communicate with the electronic device via the server. According to an embodiment, the electronic device 100 may include a processor 120, memory 130, an input module 150, a sound output module, a display module 160, an audio module 170, a sensor module 176, an interface 177, a connecting terminal 178, a haptic module, a camera module 180, a power management module 188, a battery 189, a communication module 190, a subscriber identification module (SIM) 196, or an antenna module 197.

In some embodiments, at least one of the components (e.g., the connecting terminal 178) may be omitted from the electronic device 100, or one or more other components may be added in the electronic device 100. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 100 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134.

According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 100 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 100, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 100 where the artificial intelligence is performed or via a separate server (e.g., the server). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 100. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 100, from the outside (e.g., a user) of the electronic device 100. The input module 150 may include, for example, a microphone, a mouse, a keyboard, a key (e.g., a button), or a digital pen (e.g., a stylus pen).

The sound output module may output sound signals to the outside of the electronic device 100. The sound output module may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 100. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module or a headphone of an external electronic device (e.g., an another electronic device) directly (e.g., wiredly) or wirelessly coupled with the electronic device 100.

The sensor module 176 may detect an operational state (e.g., power or temperature) of the electronic device 100 or an environmental state (e.g., a state of a user) external to the electronic device 100, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 100 to be coupled with the external electronic device (e.g., the another electronic device) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 100 may be physically connected with the external electronic device (e.g., the another electronic device). According to an embodiment, the connecting terminal 178 may include, for example, a HDMI connector, a USB connector, a SD card connector, or an audio connector (e.g., a headphone connector).

According to an embodiment, the haptic module may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 100. According to an embodiment, the power management module 188 may be implemented as at least part of, for example, a power management integrated circuit (PMIC).

The battery 189 may supply power to at least one component of the electronic device 100. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 100 and the external electronic device (e.g., the another electronic device, the electronic device, or the server) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network (e.g., a short-range communication network, such as Bluetooth™, wireless-fidelity (Wi-Fi) direct, or infrared data association (IrDA)) or the second network (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 100 in a communication network, such as the first network or the second network, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 100, an external electronic device (e.g., the electronic device), or a network system (e.g., the second network). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 100. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network or the second network, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 100 and the external electronic device via the server coupled with the second network. Each of the electronic devices 102 or 104 may be a device of a same type as, or a different type, from the electronic device 100. According to an embodiment, all or some of operations to be executed at the electronic device 100 may be executed at one or more of the external electronic devices 102, 104, or 108. For example, if the electronic device 100 should perform a function or a service automatically, or in response to a request from a user or another device, the electronic device 100, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 100. The electronic device 100 may provide the outcome, with or without further processing of the outcome, as at least part of a reply to the request. To that end, a cloud computing, distributed computing, mobile edge computing (MEC), or client-server computing technology may be used, for example. The electronic device 100 may provide ultra low-latency services using, e.g., distributed computing or mobile edge computing. In another embodiment, the external electronic device may include an internet-of-things (IoT) device. The server may be an intelligent server using machine learning and/or a neural network. According to an embodiment, the external electronic device or the server may be included in the second network. The electronic device 100 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 100). For example, a processor (e.g., the processor 120) of the machine (e.g., the electronic device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiment, the display module 160 may include a flexible display configured to be folded or unfolded.

According to the embodiment, the display module 160 may include the flexible display slidably disposed and configured to provide the screen (e.g., the display screen).

According to the embodiment, the display module 160 may also be referred to as a variable display (e.g., a stretchable display), an expandable display, or a slide-out display.

According to the embodiment, the display module 160 may also include a bar-type display or a flat plate-shaped (plate type) display.

In the embodiment, the display module 160 may include a display 161, a display driver IC 163 (hereinafter, referred to as a 'DDI 163') configured to control the display 161, and a touch circuit 165.

The DDI 163 may include an interface module 1631 comprising interface circuitry, a memory 1632 (e.g., a buffer memory), an image processing module 1633, and/or a mapping module 1634.

According to the embodiment, the DDI 163 may receive image information, which includes image data or image control signals corresponding to an instruction for controlling the image data, from another component of the electronic device 100 through the interface module 1631.

According to the embodiment, the image information may be received from the processor 120 (e.g., an application processor) or the auxiliary processor (e.g., the auxiliary processor in FIG. 1) (e.g., a graphic processing device) that operates independently of the function of the main processor.

According to the embodiment, the DDI 163 may communicate with the touch circuit 165 or the sensor module 176 through the interface module 1631. In addition, the DDI 163 may store at least a part of the received image information in the memory 1632. For example, the DDI 163 may store at least a part of the received image information in the memory 1632 on a frame-by-frame basis.

According to the embodiment, the image processing module 1633, comprising processing circuitry, may perform pre-processing or post-process (e.g., adjustment of resolution, brightness, or size) on at least some of the image data on the basis of at least some of the properties of the image data or the properties of the display 161.

According to the embodiment, the mapping module 1634 may use the image processing module 1633 to generate voltage values or current values corresponding to the image data that have been subjected to the pre-processing or post-process. In the embodiment, for example, the generation of voltage values or current values may be performed on the basis of at least some of attributes (e.g., the arrangement of pixels (RGB stripes or pentile structures) or sizes of subpixels) of pixels of the display 161.

In the embodiment, at least some of the pixels of the display 161 operate on the basis of at least some of the voltage values or current values, such that visual information (e.g., texts, images, and/or icons) corresponding to the image data may be displayed on the display 161.

According to the embodiment, the display module 160 may further include the touch circuit 165. The touch circuit 165 may include a touch sensor 1651, and a touch sensor IC 1652 for controlling the touch sensor 1651.

In the embodiment, the touch sensor IC 1652 may control the touch sensor 1651 to detect a touch input or hovering input related to a particular position of the display 161. For example, the touch sensor IC 1652 may detect a touch input or hovering input by measuring changes in signals (e.g., voltages, light amount, resistance, or charge quantities) related to a particular position of the display 161. The touch sensor IC 1652 may provide the processor 120 with information about the detected touch input or hovering input (e.g., positions, areas, pressures, or times).

According to the embodiment, at least a part of the touch circuit 165 (e.g., the touch sensor IC 1652) may be included as a part of the display driver IC 163 or the display 161.

According to the embodiment, at least a part of the touch circuit 165 (e.g., the touch sensor IC 1652) may be included as a part of another component (e.g., the auxiliary processor) disposed outside the display module 160.

According to the embodiment, the display module 160 may further include at least one sensor (e.g., an expansion detection sensor, a fingerprint sensor, an iris sensor, a pressure sensor, or an illuminance sensor) of the sensor module 176 or a control circuit for the sensor. In this case, at least one sensor or the control circuit for the sensor may be embedded in a part of the display module 160 (e.g., the display 161 or the DDI 163) or a part of the touch circuit 165. For example, in case that the sensor module 176 embedded in the display module 160 includes a biosensor (e.g., a fingerprint sensor), the biosensor may acquire bio-information (e.g., a fingerprint image) related to the touch input through a partial area of the display 161. In another example, in case that the sensor module 176 embedded in the display module 160 includes a pressure sensor, the pressure sensor may acquire pressure information related to the touch input through a partial or entire area of the display 161. In another example, in case that the sensor module 176 embedded in the display module 160 includes an expansion detection sensor, the expansion detection sensor may sense a change in area (e.g., screen size) of the display (e.g., the variable display). According to the embodiment, the touch sensor 1651 or the sensor module 176 may be disposed between the pixels of the pixel layer of the display 161 or disposed above or below the pixel layer.

According to the embodiment, the display 161 may include a digitizer 1611 for detecting an input (e.g., a touch input or a hovering input) of an input device (e.g., a stylus pen or stylus). The digitizer 1611 may convert analog coordinates of the input device (e.g., the stylus pen or stylus) into digital data and transmit the digital data to the processor 120. The processor 120 may detect the input (e.g., the touch input or the hovering input), which is made by the input device (e.g., the stylus pen), on the basis of the digital data inputted from the digitizer 1611.

Figure 2A:
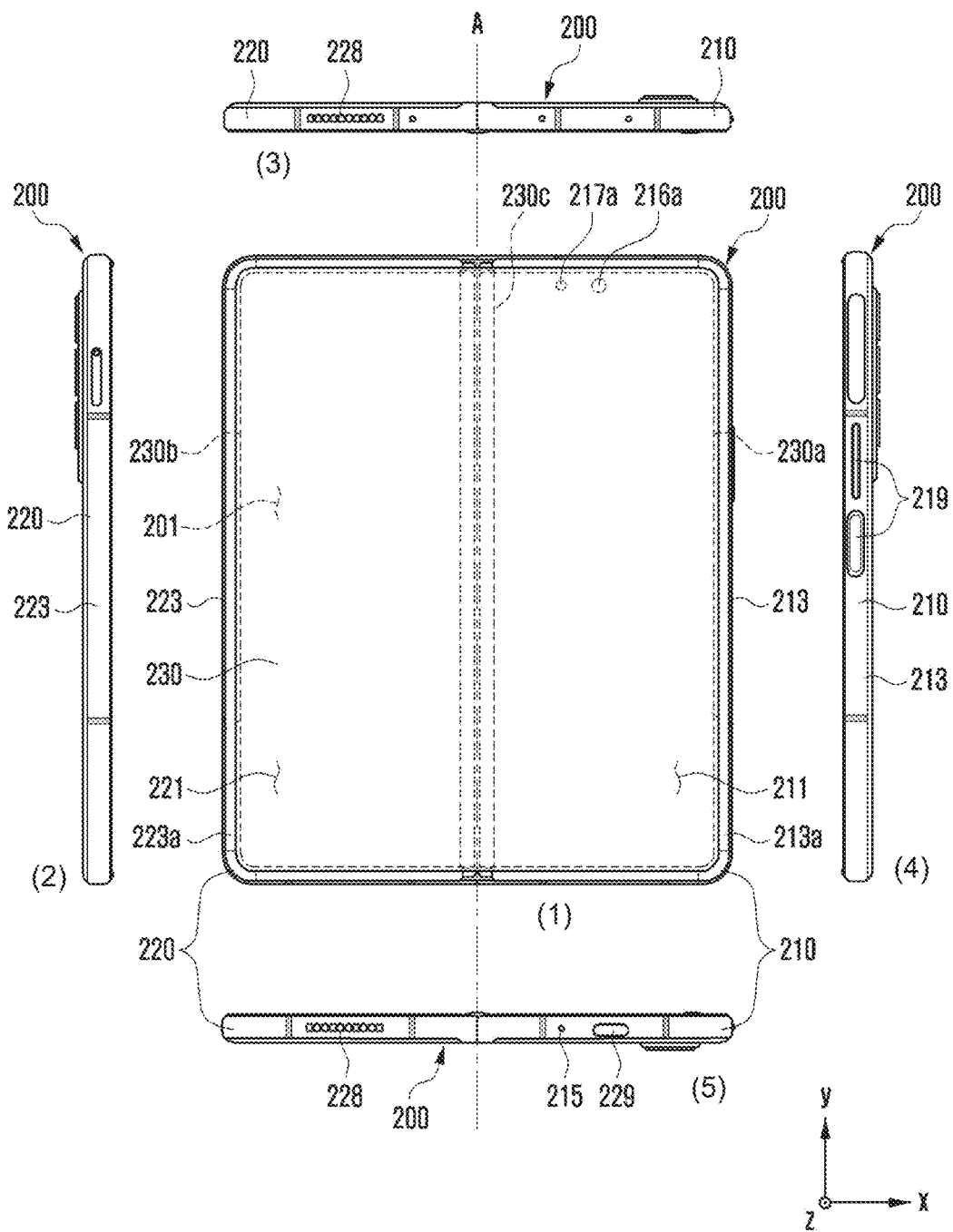
FIGS. 2A(1)-(5) and 2B are views illustrating an unfolded state (unfolded stage) of the electronic device according to various example embodiments when viewed from front and rear surfaces thereof.
Figure 2B:
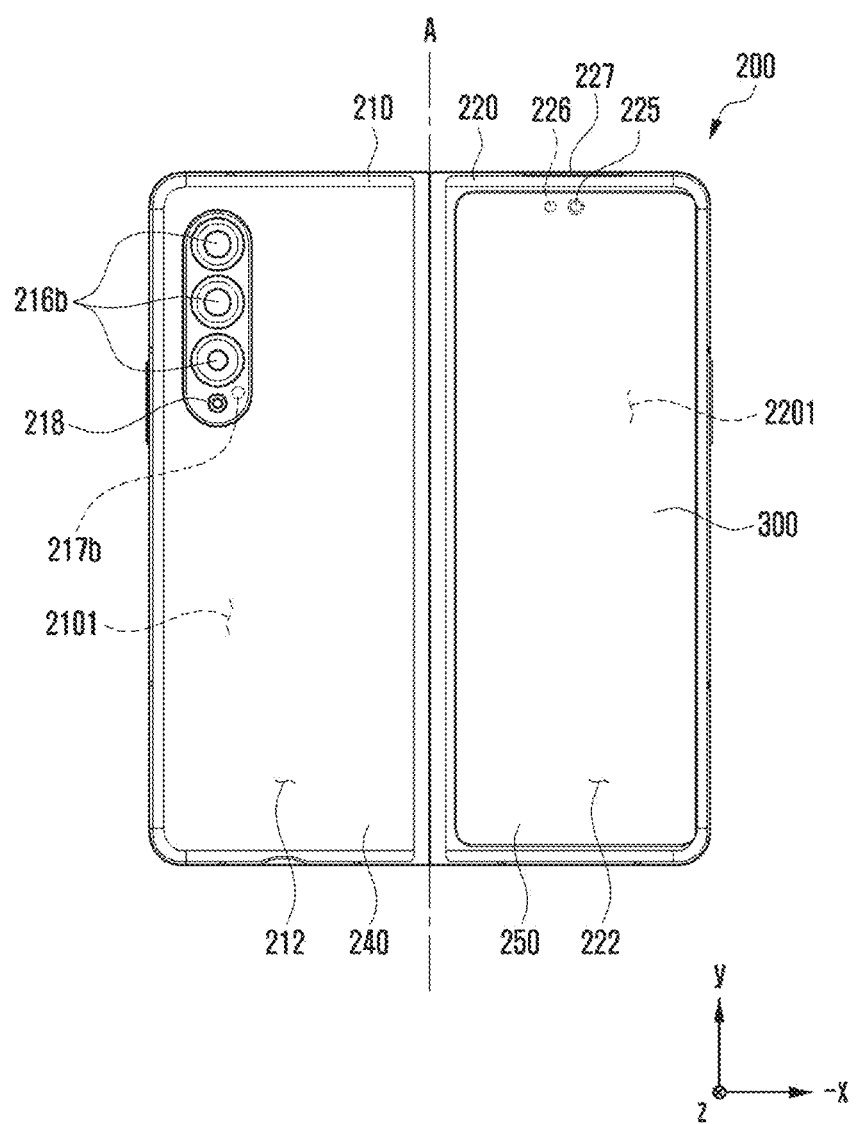
Figure 3A:
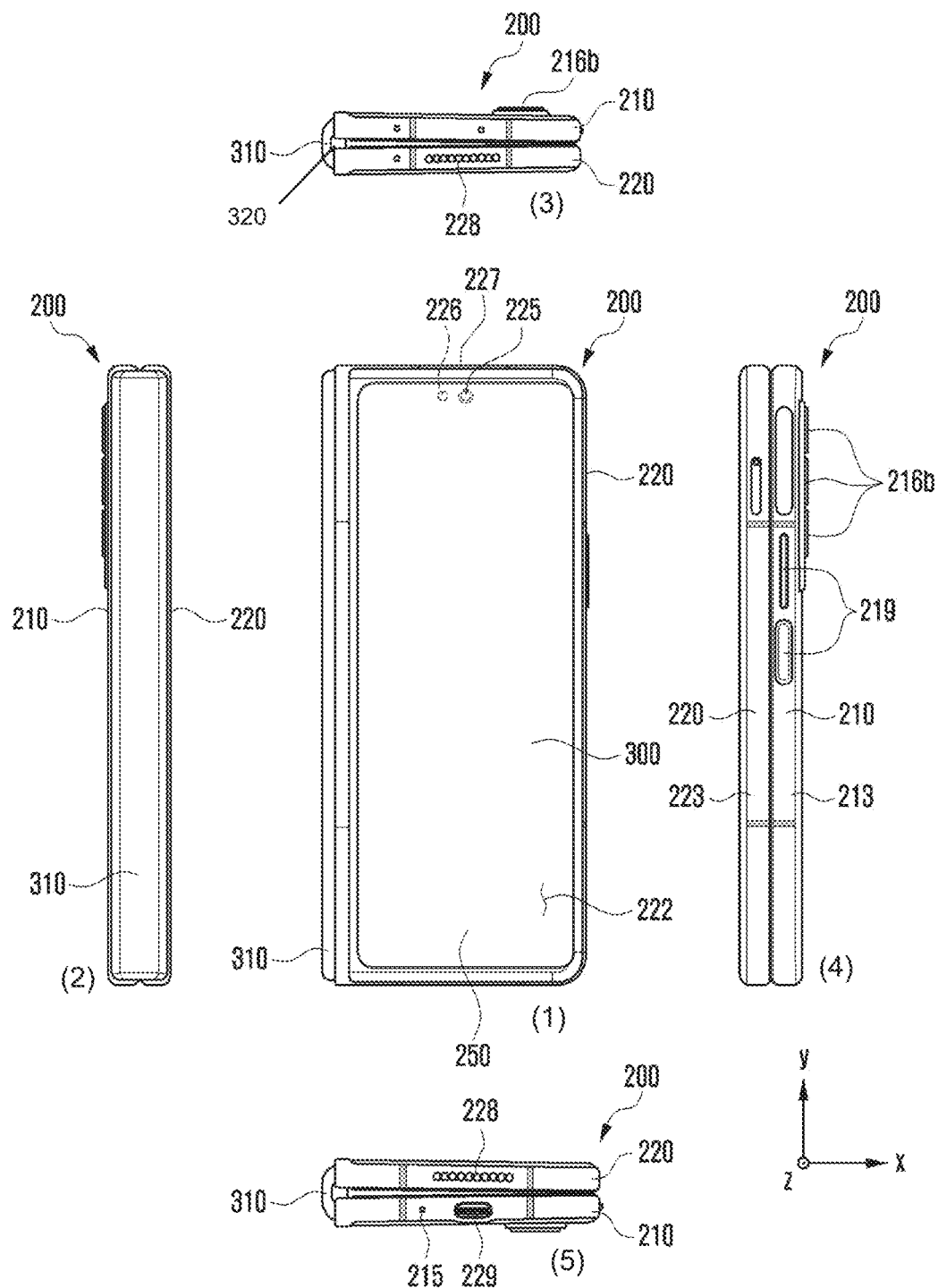
FIGS. 3A(1)-(5) and 3B are views illustrating a folded state of the electronic device according to various example embodiments when viewed from the front and rear surfaces thereof.
Figure 3B:
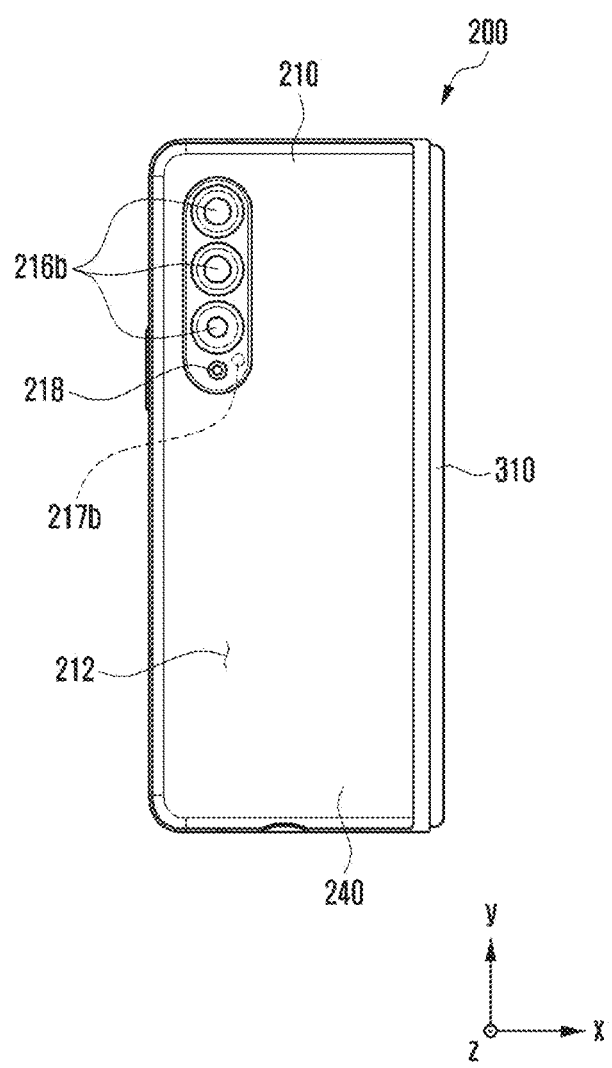

FIGS. 2A and 2B are views illustrating an unfolded state (unfolded stage) of the electronic device according to various example embodiments when viewed from front and rear surfaces thereof. FIGS. 3A and 3B are views illustrating a folded state of the electronic device according to various example embodiments when viewed from the front and rear surfaces thereof.

With reference to FIGS. 2A to 3B, an electronic device 200 may include a pair of housings 210 and 220 (e.g., foldable housing structures) coupled to each other so as to be rotatable about a folding axis A via a hinge device (e.g., a hinge module comprising a hinge) and foldable with respect to each other, a first display 230 (e.g., a flexible display, a foldable display, or a main display) disposed via the pair of housings 210 and 220, and/or a second display 300 (e.g., a sub-display) disposed by means of the second housing 220.

According to the embodiment, at least a part of the hinge device (e.g., a hinge device 320 in FIG. 3) may be disposed to be invisible from the outside via the first housing 210 and the second housing 220. In the unfolded state, the hinge device may be disposed to be invisible from the outside via a hinge housing 310 that covers a foldable portion.

According to the embodiment, the hinge device 320 may include a gear assembly including a plurality of gears, a hinge module including a plurality of hinge cams coupled to hinge shafts, which rotate via the gear assembly, and configured to perform cam operations, and hinge plates configured to connect the hinge module, the first housing 210, and the second housing 220.

A surface on which the first display 230 is disposed may be a front surface of the electronic device 200, and a surface opposite to the front surface may be a rear surface of the electronic device 200. In addition, a surface, which surrounds a space between the front surface and the rear surface, may be a side surface of the electronic device 200.

According to various example embodiments, the pair of housings 210 and 220 may include the first housing 210 and the second housing 220 disposed to be foldable with respect to each other via the hinge device.

According to the embodiment, the pair of housings 210 and 220 is not limited by shapes and coupling illustrated in FIGS. 2A to 3B and may be implemented by combination and/or coupling of other shapes or components. According to the embodiment, the first housing 210 and the second housing 220 may be disposed at two opposite sides based on the folding axis A and have an entirely symmetric shape with respect to the folding axis A. According to any embodiment, the first housing 210 and the second housing 220 may be folded asymmetrically with respect to the folding axis A.

According to the embodiment, an angle or distance between the first housing 210 and the second housing 220 may vary depending on whether the electronic device 200 is in an unfolded state (unfolded stage), a folded state, or an intermediate state.

According to various embodiments, in the unfolded state of the electronic device 200, the first housing 210 may include a first surface 211 connected, directly or indirectly, to the hinge device and disposed to be directed toward the front surface of the electronic device 200, a second surface 212 directed in a direction opposite to the first surface 211, and/or a first lateral member 213 configured to surround at least a part of a first space between the first surface 211 and the second surface 212.

According to the embodiment, in the unfolded state of the electronic device 200, the second housing 220 may include a third surface 221 connected, directly or indirectly, to the hinge device and disposed to be directed toward the front surface of the electronic device 200, a fourth surface 222 directed in a direction opposite to the third surface 221, and/or a second lateral member 223 configured to surround at least a part of a second space between the third surface 221 and the fourth surface 222.

According to the embodiment, the first surface 211 is directed in substantially the same direction as the third surface 221 in the unfolded state, and the first surface 211 may at least partially face the third surface 221 in the folded state.

According to the embodiment, the electronic device 200 may also include a recess 201 formed by structurally coupling the first housing 210 and the second housing 220 and configured to accommodate the first display 230. The first display 230 may be disposed to be supported by the first housing 210 and the second housing 220. According to the embodiment, the recess 201 may have substantially the same size as the first display 230. According to the embodiment, the first housing 210 may include a first protective frame 213a (e.g., a first decorative member) coupled to the first lateral member 213, disposed to overlap an edge of the first display 230, and configured to cover the edge of the first display 230 so that the edge of the first display 230 is not visible from the outside when the first display 230 is viewed from above. According to the embodiment, the first protective frame 213a may be integrated with the first lateral member 213.

According to the embodiment, the second housing 220 may include a second protective frame 223a (e.g., a second decorative member) coupled to the second lateral member 223, disposed to overlap an edge of the first display 230, and configured to cover the edge of the first display 230 so that the edge of the first display 230 is not visible from the outside when the first display 230 is viewed from above. According to the embodiment, the second protective frame 223a may be integrated with the first lateral member 223. In any embodiment, the first protective frame 213a and the second protective frame 223a may be excluded.

According to various embodiments, the hinge housing 310 (e.g., the hinge cover) may be disposed between the first housing 210 and the second housing 220 and disposed to cover a part of the hinge device (e.g., at least one hinge module) disposed in the hinge housing 310. According to the embodiment, the hinge housing 310 may be covered by a part of the first housing 210 and a part of the second housing 220 or exposed to the outside in accordance with whether the electronic device 200 is in the unfolded state, the folded state, or the intermediate state. For example, in case that the electronic device 200 is in the unfolded state, at least a part of the hinge housing 310 may be covered by the first housing 210 and the second housing 220 and may not be substantially exposed. According to the embodiment, in case that the electronic device 200 is in the folded state, at least a part of the hinge housing 310 may be exposed to the outside between the first housing 210 and the second housing 220.

According to the embodiment, in the intermediate state in which the first housing 210 and the second housing 220 define a predetermined angle therebetween (are folded with a certain angle), the hinge housing 310 may be disposed between at least the first housing 210 and the second housing 220 so that the hinge housing 310 is at least partially exposed to the outside of the electronic device 200. For example, an area of the hinge housing 310, which is exposed to the outside, may be smaller than an area of the hinge housing 310 exposed to the outside in the fully folded state. According to the embodiment, the hinge housing 310 may include a curved surface.

According to various embodiments, in case that the electronic device 200 is in the unfolded state (e.g., the state in FIGS. 2A and 2B), the first housing 210 and the second housing 220 may define an angle of about 180 degrees. A first area 230a, a second area 230b, and a folding area 230c of the first display 230 may be disposed on the same plane and directed in substantially the same direction (e.g., a z-axis direction). In another embodiment, in case that the electronic device 200 is in the unfolded state, the first housing 210 may be rotated by an angle of about 360 degrees relative to the second housing 220 and folded reversely so that the second surface 212 and the fourth surface 222 face each other (out-folding manner).

According to various embodiments, in case that the electronic device 200 is in the folded state (e.g., the state in FIGS. 3A and 3B), the first surface 211 of the first housing 210 and the third surface 221 of the second housing 220 may be disposed to face each other. In this case, the first area 230a and the second area 230b of the first display 230 may also be disposed to face each other while defining a narrow angle (e.g., within a range of 0 to about 10 degrees) therebetween via the folding area 230c. According to the embodiment, at least a part of the folding area 230c may be deformed in a curved shape having a predetermined curvature.

According to the embodiment, in case that the electronic device 200 is in the intermediate state, the first housing 210 and the second housing 220 may be disposed at a predetermined angle (a certain angle) with respect to each other. In this case, the first area 230a and the second area 230b of the first display 230 may define an angle larger than an angle in the folded state and smaller than an angle in the unfolded state. A curvature of the folding area 230c may be smaller than a curvature in the folded state and larger than a curvature in the unfolded state.

In any embodiment, the first and second housings 210 and 220 may define an angle via the hinge device so that the first and second housings 210 and 220 may be stopped at a predetermined folding angle between the folded state and the unfolded state (free stop function). In any embodiment, the first housing 210 and the second housing 220 may operate consistently while being pressed in an unfolding direction or a folding direction based on a designated inflection angle via the hinge device (e.g., the hinge device 320 in FIG. 3).

According to various embodiments, the electronic device 200 may include at least one of at least one of displays 230 and 300 disposed in the first housing 210 and/or the second housing 220, an input device 215, sound output devices 227 and 228, sensor modules 217a, 217b, and 226, camera modules 216a, 216b, and 225, key input devices 219, an indicator (not illustrated), and a connector port 229. In any embodiment, the electronic device 200 may exclude at least one of the constituent elements or further include at least one of other constituent elements.

According to various embodiments, at least one of the displays 230 and 300 may include the first display 230 (e.g., the flexible display) disposed to be supported by the third surface 221 of the second housing 220 from the first surface 211 of the first housing 210 via the hinge device, and the second display 300 disposed in an internal space of the second housing 220 so as to be at least partially visible from the outside through the fourth surface 222. In any embodiment, the second display 300 may also be disposed in an internal space of the first housing 210 so as to be visible from the outside through the second surface 212. In the embodiment, the first display 230 may be mainly used when the electronic device 200 is in the unfolded state, and the second display 300 may be mainly used when the electronic device 200 is in the folded state. According to the embodiment, in the intermediate state, the electronic device 200 may control the first display 230 and/or the second display 300 on the basis of a folding angle between the first housing 210 and the second housing 220 so that the first display 230 and/or the second display 300 may be used.

According to various embodiments, the first display 230 may be disposed in an accommodation space between at least the pair of housings 210 and 220. For example, the first display 200 may be disposed in the recess 201 defined by the pair of housings 210 and 220 and disposed to occupy the substantially most part of the front surface of the electronic device 200 in the unfolded state.

According to the embodiment, the first display 230 may include a flexible display having at least a partial area that may be deformed to a flat or curved surface. According to the embodiment, the first display 230 may include the first area 230a facing the first housing 210, and the second area 230b facing the second housing 220. According to the embodiment, the first display 230 may include the folding area 230c including a part of the first area 230a and a part of the second area 230b based on the folding axis A. According to the embodiment, at least a part of the folding area 230c may include an area corresponding to the hinge device.

According to the embodiment, the division of the area of the first display 230 is just an exemplary physical division made by the pair of housings 210 and 220 and the hinge device. The first display 230 may substantially display a single seamless entire screen through the pair of housings 210 and 220 and the hinge device. According to the embodiment, the first area 230a and the second area 230b may have an entirely symmetric shape or a partially asymmetric shape based on the folding area 230c.

According to various embodiments, the electronic device 200 may include a first rear surface cover 240 disposed on the second surface 212 of the first housing 210, and a second rear surface cover 250 disposed on the fourth surface 222 of the second housing 220. In any embodiment, at least a part of the first rear surface cover 240 may be integrated with the first lateral member 213. In any embodiment, at least a part of the second rear surface cover 250 may be integrated with the second lateral member 223. According to the embodiment, at least one of the first rear surface cover 240 and the second rear surface cover 250 may be provided in the form of a substantially transparent plate (e.g., a glass or polymer plate including various coating layers) or an opaque plate.

According to the embodiment, for example, the first rear surface cover 240 may be provided in the form of an opaque plate made of coated or tinted glass, ceramic, polymer, metal (e.g., aluminum, stainless steel (STS), or magnesium), or a combination of at least two of the above-mentioned materials. According to the embodiment, for example, the second rear surface cover 250 may be provided in the form of a substantially transparent plate made of glass, polymer, or the like. Therefore, the second display 300 may be disposed in the internal space of the second housing 220 so as to be visible from the outside through the second rear surface cover 250.

According to various embodiments, the input device 215 may include a microphone. In any embodiment, the input device 215 may include a plurality of microphones disposed to detect a direction of sound. According to the embodiment, the sound output devices 227 and 228 may include speakers. According to the embodiment, the sound output devices 227 and 228 may include a telephone receiver 227 disposed via the fourth surface 222 of the second housing 220, and an external speaker 228 disposed via at least a part of the second lateral member 223 of the second housing 220. In any embodiment, the input device 215, the sound output devices 227 and 228, and the connector 229 may be disposed in spaces of the first housing 210 and/or the second housing 220 and exposed to an external environment through at least one hole formed in the first housing 210 and/or the second housing 220. In any embodiment, the holes formed in the first housing 210 and/or the second housing 220 may be used in common for the input device 215 and the sound output devices 227 and 228. In any embodiment, the sound output devices 227 and 228 may include speakers (e.g., piezoelectric speakers) that operate without holes formed in the first housing 210 and/or the second housing 220.

According to various embodiments, the camera modules 216a, 216b, and 225 may include a first camera module 216a disposed on the first surface 211 of the first housing 210, a second camera module 216b disposed on the second surface 212 of the first housing 210, and/or a third camera module 225 disposed on the fourth surface 222 of the second housing 220. According to the embodiment, the electronic device 200 may include a flash 218 disposed in the vicinity of the second camera module 216b. According to the embodiment, for example, the flash 218 may include a light-emitting diode or a xenon lamp. According to the embodiment, the camera modules 216a, 216b, and 225 may each include one lens or a plurality of lenses, an image sensor, and/or an image signal processor. In any embodiment, at least one of the camera modules 216a, 216b, and 225 may include two or more lenses (e.g., a wide-angle lens and a telephoto lens) and image sensors and be disposed together on any one surface of the first housing 210 and/or the second housing 220.

According to various embodiments, the sensor modules 217a, 217b, and 226 may generate electrical signals or data values corresponding to an internal operating state of the electronic device 200 or the external environment state. According to the embodiment, the sensor modules 217a, 217b, and 226 may include a first sensor module 217a disposed on the first surface 211 of the first housing 210, a second sensor module 217b disposed on the second surface 212 of the first housing 210, and/or a third sensor module 226 disposed on the fourth surface 222 of the second housing 220. In any embodiment, the sensor modules 217a, 217b, and 226 may include at least one of a gesture sensor, a grip sensor, a color sensor, an infrared (IR) sensor, an illuminance sensor, an ultrasonic sensor, an iris recognition sensor, and a distance detection sensor (e.g., a time-of-flight (TOF) sensor or a LiDAR (light detection and ranging) sensor).

According to various embodiments, the electronic device 200 may further include at least one of the non-illustrated sensor modules, e.g., an atmospheric pressure sensor, a magnetic sensor, a biosensor, a temperature sensor, a humidity sensor, and a fingerprint recognition sensor. In any embodiment, the fingerprint recognition sensor may be disposed via at least one of the first lateral member 213 of the first housing 210 and/or the second lateral member 223 of the second housing 220.

According to various embodiments, the key input devices 219 may be disposed to be exposed to the outside through the first lateral member 213 of the first housing 210. In any embodiment, the key input devices 219 may be disposed to be exposed to the outside through the second lateral member 223 of the second housing 220. In any embodiment, the electronic device 200 may exclude some or all of the key input devices 219, and the excluded key input device 219 may be implemented as other types such as a soft key on at least one of the displays 230 and 300. In another embodiment, the key input device 219 may be implemented by using a pressure sensor included in at least one of the displays 230 and 300.

According to various embodiments, the connector port 229 may include a connector (e.g., a USB connector or an interface connector port module (IF module)) configured to transmit or receive power and/or data to or from an external electronic device. In any embodiment, the connector port 229 may serve to transmit or receive audio signals to or from the external electronic device or further include a separate connector port (e.g., an earphone jack hole) for transmitting or receiving audio signals to or from the external electronic device.

According to various embodiments, at least one of the camera modules 216a and 225 among the camera modules 216a, 216b, and 225, at least one of the sensor modules 217a and 226 among the sensor modules 217a, 217b, and 226, and/or the indicator may be disposed to be exposed through at least one of the displays 230 and 300. For example, at least one of the camera modules 216a and 225, at least one of the sensor modules 217a and 226, and/or the indicator may be provided in the internal space of at least one of the housings 210 and 220, disposed below an activation area (display area) of at least one of the displays 230 and 300, and disposed to adjoin the external environment through a transparent area or an opening bored to a cover member (e.g., a window layer (not illustrated) of the first display 230 and/or the second rear surface cover 250). According to the embodiment, an area, in which at least one of the displays 230 and 300 faces at least one of the camera modules 216a and 225, may be a part of the area for displaying content and indicated as a transmissive area having a predetermined transmittance rate.

According to the embodiment, the transmissive area may be formed to have a transmittance rate within a range of about 5% to about 20%. The transmissive area may include an area that overlaps an effective area (e.g., a view angle area) of at least one of the camera modules 216a and 225 through which light, which enters an image sensor to create an image, passes. For example, the transmissive area of the display 230 or 300 may include an area having a lower pixel density than the periphery thereof. For example, the transmissive area may be substituted for the opening. For example, at least one of the camera modules 216a and 225 may include an under-display camera (UDC) or an under-panel camera (UPC). In another embodiment, some of the camera modules or some of the sensor modules 217a and 226 may be disposed to perform the functions thereof without being visually exposed through the display. For example, an area, which faces the camera modules 216a and 225 and/or the sensor modules 217a and 226 disposed below the displays 230 and 300 (e.g., the display panels), is an under-display camera (UDC) structure that does not require the bored opening.

Figure 4:
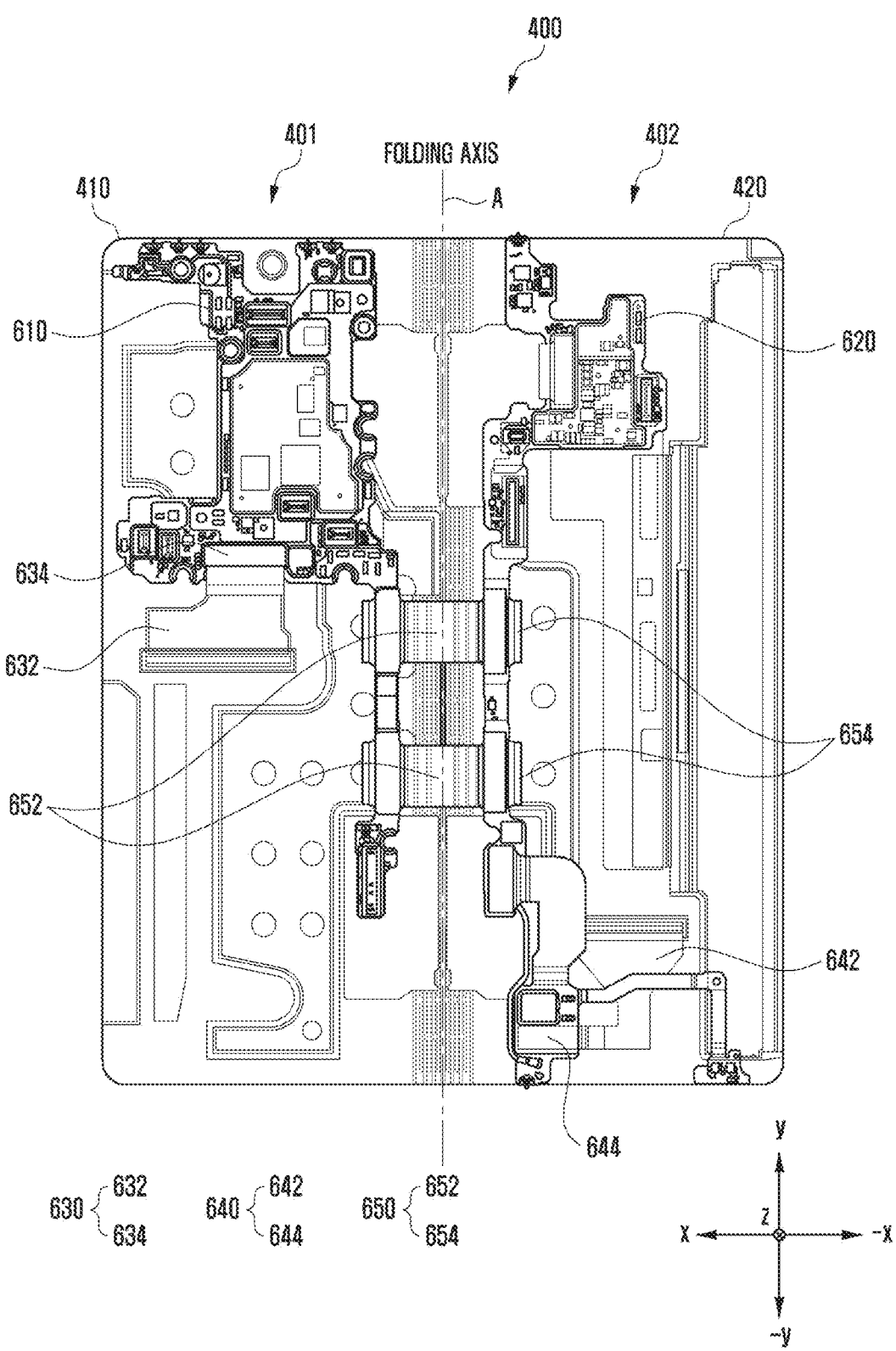
FIG. 4 is a view illustrating the inside of the electronic device according to various example embodiments when viewed from a first surface (e.g., a rear surface) thereof.
Figure 5:
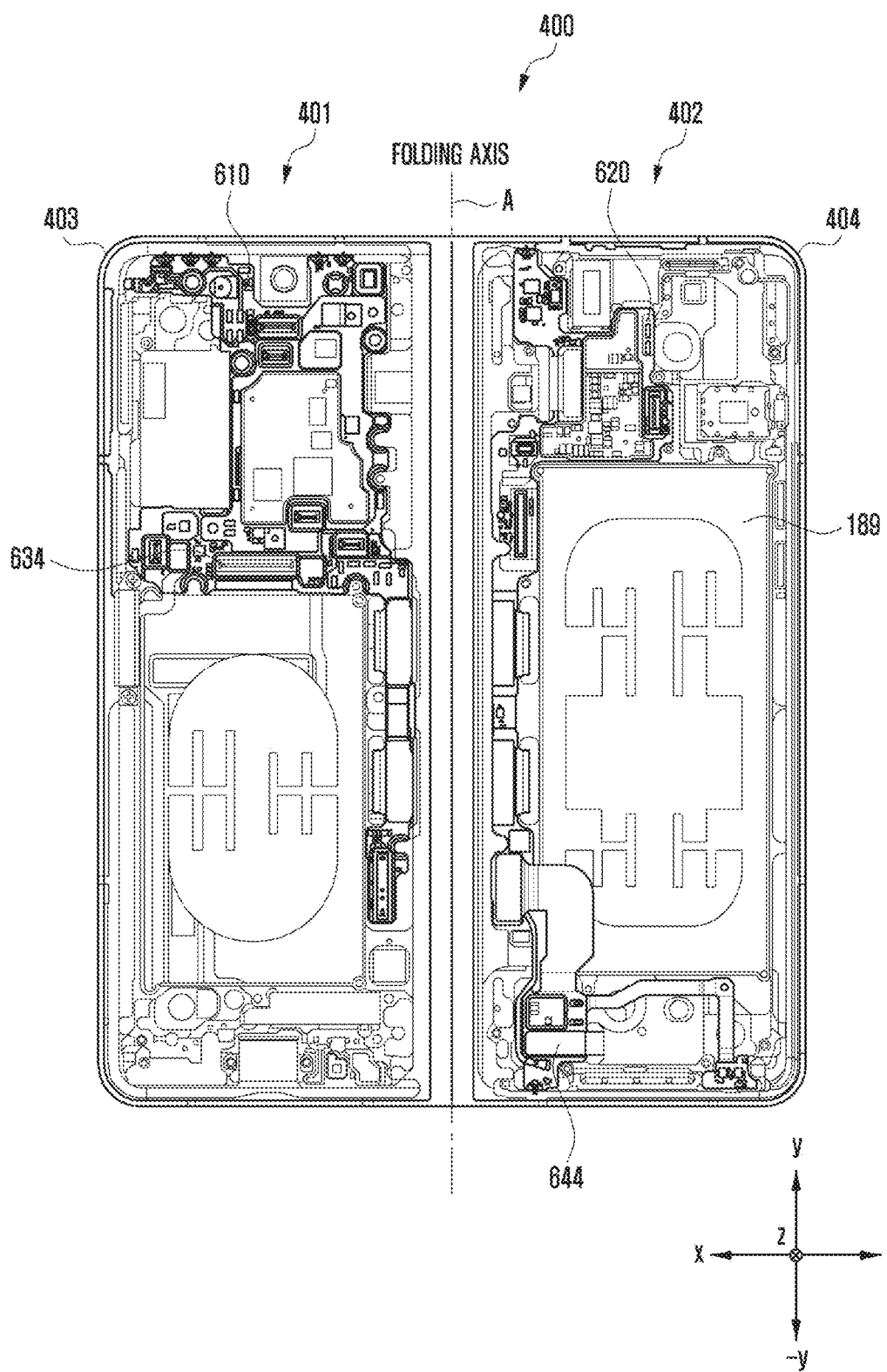
FIG. 5 is a view illustrating the electronic device according to various example embodiments and illustrating a state in which electronic components and mechanisms are disposed on a first electromagnetic resonance (EMR) sheet and a second EMR sheet (e.g., a-z-axis) in FIG. 4.
Figure 6:
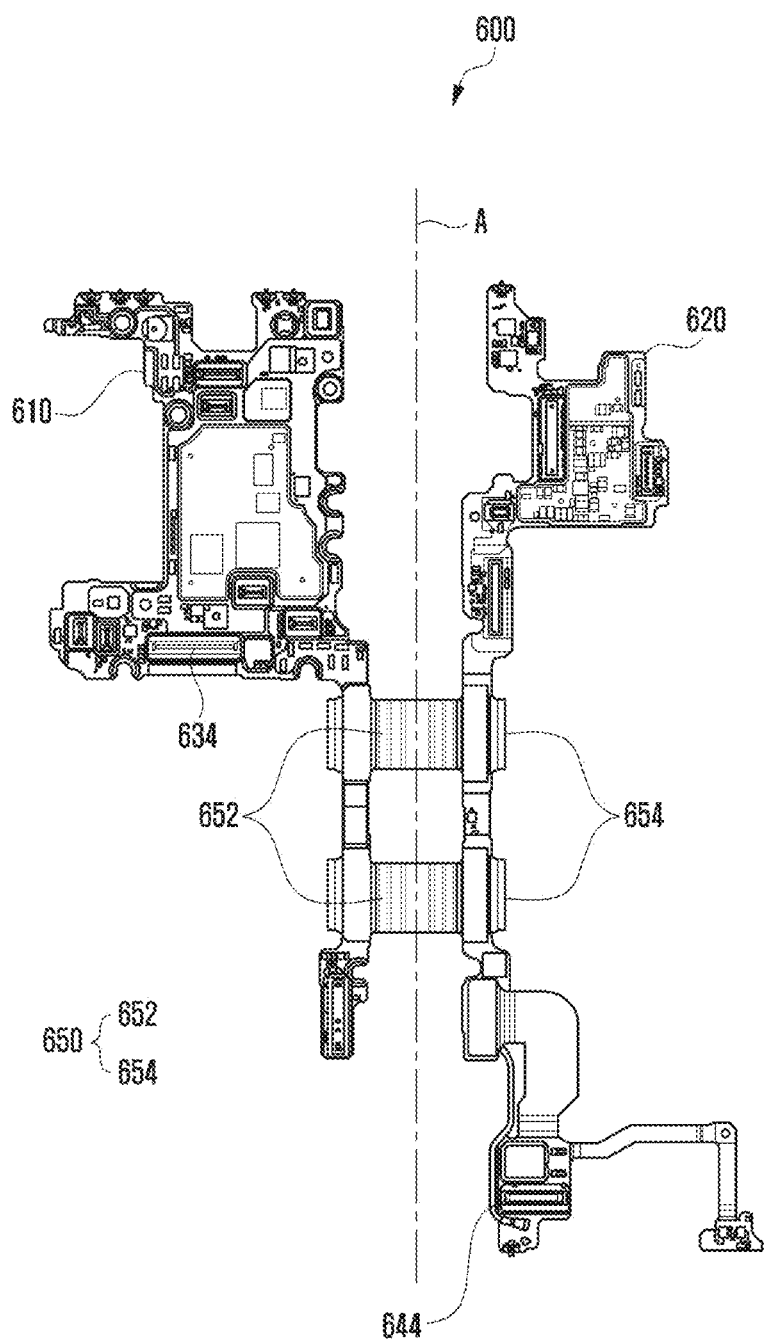
FIG. 6 is a view illustrating for example a first printed circuit board (e.g., a first printed board assembly (PBA)), a second printed circuit board (e.g., a second PBA), a first flexible printed circuit board (FPCB) structure, a second FPCB structure, and a third FPCB structure.

FIG. 4 is a view illustrating the inside of the electronic device according to various example embodiments when viewed from a first surface (e.g., a rear surface) thereof. FIG. 5 is a view illustrating the electronic device according to various example embodiments and illustrating a state in which electronic components and mechanisms are disposed on a first electromagnetic resonance (EMR) sheet and a second EMR sheet (e.g., a-z-axis) in FIG. 4. FIG. 6 is a view 600 illustrating a first printed circuit board (e.g., a first printed board assembly (PBA)), a second printed circuit board (e.g., a second PBA), a first flexible printed circuit board (FPCB) structure, a second FPCB structure, and a third FPCB structure. With reference to FIGS. 4 to 6, an electronic device 400 (e.g., the electronic device 100 in FIG. 1 or the electronic device 200 in FIGS. 2 and 3) according to various example embodiments may include a first housing structure 403 (e.g., the first housing structure 211 in FIGS. 2 and 3), a second housing structure 404 (e.g., the second housing structure 212 in FIGS. 2 and 3), a display (e.g., the display 161 in FIG. 1, the display 220 in FIG. 2, and a display 710 in FIG. 7), digitizers 410 and 420 (e.g., the digitizer 1611 in FIG. 1), a first printed circuit board 610 (e.g., a first printed board assembly (PBA)), a second printed circuit board 620 (e.g., a first PBA), a first FPCB structure 630, a second FPCB structure 640, and a third FPCB structure 650. In FIG. 4, when actually viewed from the display, the digitizers 410 and 420, the displays 220 and 710, the first housing structure 403 (or the second housing structure 404), and the first printed circuit board 610 (or the second printed circuit board 620) may be sequentially stacked. FIG. 4 illustrates a state in which the first housing structure 403 (or the second housing structure 404) is excluded. FIG. 5 illustrates a state in which a battery 189 is disposed in addition to the components in FIG. 4.

In the embodiment, the first and second housing structures 403 and 404 may be disposed at two opposite sides based on the folding axis A and have an entirely symmetric shape with respect to the folding axis A. An angle or distance between the first housing structure 403 and the second housing structure 404 may vary depending on whether a state of the electronic device 400 is a first state (e.g., an unfolded state), a second state (e.g., a folded state), or a third state (e.g., an intermediate state between the unfolded state and the folded state).

In the embodiment, the display (e.g., the display 710 in FIG. 7) may be disposed in a space defined by the first housing structure 403 and the second housing structure 404. FIGS. 4 and 5 illustrate the interior of the electronic device 400 when viewed from the first surface (e.g., the rear surface). The display (e.g., the display 710 in FIG. 7) may be invisible by being covered by the digitizers 410 and 420, electronic components, and mechanisms. For example, the display 710 may include a flexible display or a foldable display.

In the embodiment, a surface of the display (e.g., the display 710 in FIG. 7), on which a screen is displayed, may be a first surface (e.g., a front surface) or a front surface of the electronic device 400 (e.g., a surface on which a screen is displayed in an unfolded state). Further, a surface opposite to the front surface may be a second surface (e.g., a rear surface) or a rear surface of the electronic device 400. In addition, a surface, which surrounds a space between at least the front surface and the rear surface, may be a third surface or a side surface of the electronic device 400.

In the embodiment, the electronic device 400 is configured such that a first area 401 (e.g., a right area) and a second area 402 (e.g., a left area) may be folded or unfolded in an x-axis direction about a folding axis (e.g., axis A).

In the embodiment, the digitizers 410 and 420 may include two electromagnetic resonance (EMR) sheets (or EMR films) separated in a leftward/rightward direction (or an upward/downward direction). For example, the digitizers 410 and 420 may include a first EMR sheet 410 (e.g., a right EMR sheet) and a second EMR sheet 420 (e.g., a left EMR sheet).

For example, the first EMR sheet 410 (e.g., the right EMR sheet) and the second EMR sheet 420 (e.g., the left EMR sheet) may be structured to be separated in the leftward/rightward direction based on the folding axis A of the electronic device 400.

For example, the first EMR sheet 410 (e.g., the right EMR sheet) may be disposed in a space defined by the first housing structure 403, and the second EMR sheet 420 (e.g., the left EMR sheet) may be disposed in a space defined by the second housing structure 404.

For example, the first EMR sheet 410 (e.g., the right EMR sheet) may be positioned at the right side when viewed from the front surface of the electronic device 400 or positioned at the left side when viewed from the rear surface of the electronic device 400.

For example, the second EMR sheet 420 (e.g., the left EMR sheet) may be positioned at the left side when viewed from the front surface of the electronic device 400 or positioned at the right side when viewed from the rear surface of the electronic device 400.

In the embodiment, the first EMR sheet 410 may be electrically connected to the first printed circuit board 610 (e.g., the first printed board assembly (PBA)) through the first FPCB structure 630 (e.g., a right neck flexible printed circuit board (FPCB) and a connector). The first FPCB structure 630 may include a first FPCB 632 and a connector 634. In the embodiment, the first EMR sheet 410 and the first FPCB structure 630 may be formed as a single configuration. In another embodiment, the first EMR sheet 410 and the first FPCB structure 630 may be formed separately, and the first EMR sheet 410 and the first FPCB structure 630 may be electrically connected, directly or indirectly.

In the embodiment, the second EMR sheet 420 may be electrically connected to the second printed circuit board 620 (e.g., the second PBA) through the second FPCB structure 640 (a left neck FPCB and a connector). The second FPCB structure 640 may include a second FPCB 642 and a connector 644. In the embodiment, the second EMR sheet 420 and the second FPCB structure 640 may be formed as a single configuration. In another embodiment, the second EMR sheet 420 and the second FPCB structure 640 may be formed separately, and the second EMR sheet 420 and the second FPCB structure 640 may be electrically connected, directly or indirectly.

In the embodiment, first lines (e.g., first lines 810 in FIG. 8), which define x-axis channels of the first EMR sheet 410, may be electrically connected, directly or indirectly, to an EMR drive IC (e.g., an EMR drive IC 612 in FIG. 7) disposed on the first printed circuit board 610 (e.g., the first PBA).

In the embodiment, second lines (e.g., second lines 820 in FIG. 8), which define x-axis channels of the second EMR sheet 420, may be electrically connected, directly or indirectly, to the second printed circuit board 620.

In the embodiment, the first printed circuit board 610 (e.g., the first PBA) and the second printed circuit board 620 (e.g., the second PBA) may be electrically connected, directly or indirectly, to the third FPCB structure 650 (e.g., a C2C FPCB and a connector). The third FPCB structure 650 may include a third FPCB 652 and a connector 654. The third FPCB 652 of the third FPCB structure 650 may include a plurality of FPCBs. The connector 654 of the third FPCB structure 650 may include a plurality of connectors. For example, the first lines (e.g., the first lines 810 in FIG. 8), which define the x-axis channels of the first EMR sheet 410, and the second lines (e.g., the second lines 820 in FIG. 8), which define the x-axis channels of the second EMR sheet 420, may be electrically connected through the third FPCB structure 650 (e.g., the C2C FPCB and connector). The first lines (e.g., the first lines 810 in FIG. 8) of the first EMR sheet 410 and the second lines (e.g., the second lines 820 in FIG. 8) of the second EMR sheet 420 may be electrically connected, directly or indirectly, to define closed loops.

Figure 7:
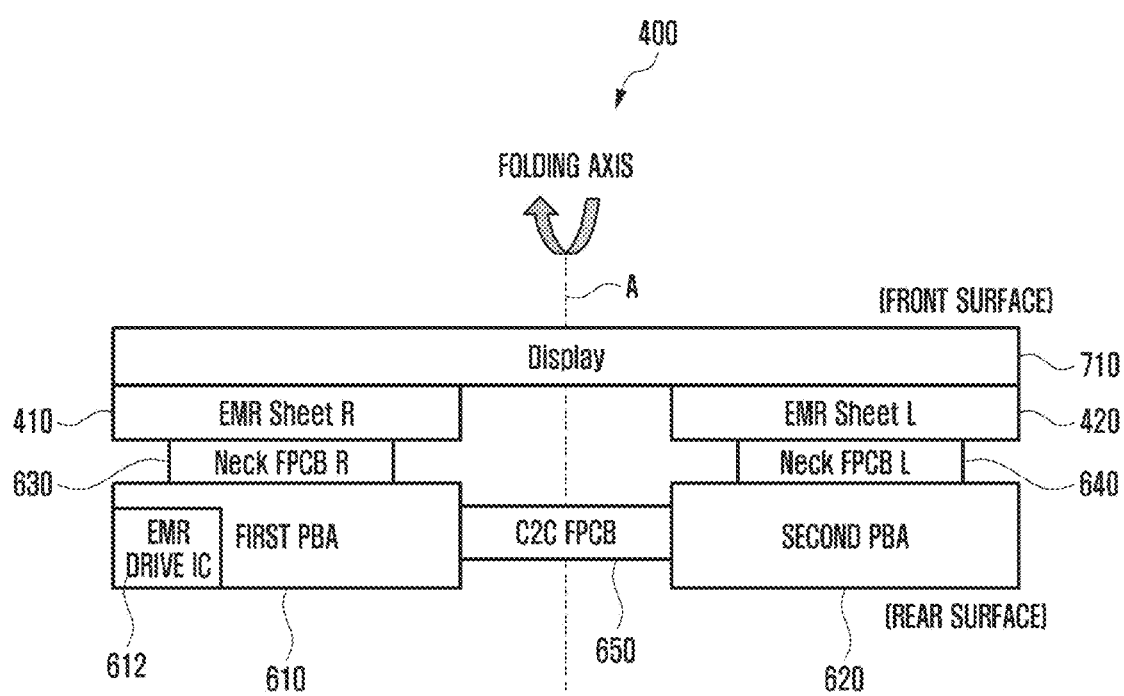
FIG. 7 is a stacked view of the electronic device according to various example embodiments.

FIG. 7 is a stacked view of the electronic device 400 according to various example embodiments. FIG. 8 is a view 800 illustrating connection structures of the first printed circuit board, the second printed circuit board, the first EMR sheet, and the second EMR sheet of the electronic device according to various example embodiments.

With reference to FIGS. 7 and 8, in the embodiment, the display 710 may be disposed on the front surface of the electronic device 400, and the digitizers 410 and 420 may be disposed below the display 710 (e.g., in a rear surface direction). For example, the display 710 and the digitizers 410 and 420 may be disposed to overlap one another in the z-axis direction.

In the embodiment, at least a part of the first FPCB structure 630 may be disposed below the first EMR sheet 410 (e.g., in the rear surface direction). For example, the first EMR sheet 410 and at least a part of the first FPCB structure 630 may be disposed to overlap each other in the z-axis direction.

In the embodiment, at least a part of the second FPCB structure 640 may be disposed below the second EMR sheet 420 (e.g., in the rear surface direction). For example, the second EMR sheet 420 and at least a part of the second FPCB structure 640 may be disposed to overlap each other in the z-axis direction.

In the embodiment, the first printed circuit board 610 (e.g., the first PBA) may be disposed below the first FPCB structure 630 (e.g., in the rear surface direction). For example, the first FPCB structure 630 and at least a part of the first printed circuit board 610 (e.g., the first PBA) may be disposed to overlap each other in the z-axis direction.

In the embodiment, the second printed circuit board 620 (e.g., the second PBA) may be disposed below the second FPCB structure 640. For example, the second FPCB structure 640 and at least a part of the second printed circuit board 620 (e.g., the second PBA) may be disposed to overlap each other in the z-axis direction.

In the embodiment, the first printed circuit board 610 (e.g., the first PBA) and the second printed circuit board 620 (e.g., the second PBA) may be electrically connected through the third FPCB structure 650 (e.g., the C2C FPCB and connector), such that the first EMR sheet 410 and the second EMR sheet 420 may be electrically connected, directly or indirectly.

In the embodiment, the first EMR sheet 410 (e.g., the right EMR sheet) may include a plurality of first lines 810 (e.g., x-axis lines) that defines a plurality of x-axis channels (x ch). The second EMR sheet 420 (e.g., the left EMR sheet) may include a plurality of second lines 820 (e.g., the x-axis lines) that defines a plurality of x-axis channels (x ch).

In the embodiment, the first EMR sheet 410 may include a plurality of y-axis lines that defines a plurality of y-axis channels (y ch). The second EMR sheet 420 may include a plurality of y-axis lines that defines a plurality of y-axis channels (y ch). For example, the first lines 810 (e.g., the x-axis lines) of the x-axis channels and the lines (e.g., the y-axis lines) of the Y-axis channels, which are disposed on the first EMR sheet 410, may be orthogonal to one another. The first lines 810 (e.g., the x-axis lines) of the x-axis channels and the lines (e.g., the y-axis lines) of the Y-axis channels, which are disposed on the first EMR sheet 410, may be electrically insulated.

For example, the second lines 820 (e.g., the x-axis lines) of the x-axis channels and the lines (e.g., the y-axis lines) of the Y-axis channels, which are disposed on the second EMR sheet 420, may be orthogonal to one another. The second lines 820 (e.g., the x-axis lines) of the x-axis channels and the lines (e.g., the y-axis lines) of the Y-axis channels, which are disposed on the second EMR sheet 420, may be electrically insulated.

In the embodiment, twenty-three x-axis channels may be formed on the first EMR sheet 410 and the second EMR sheet 420, and the first lines 810 and the second lines 820 for forming the twenty-three x-axis channels may be disposed on the first EMR sheet 410 and the second EMR sheet 420. For example, in order to form the twenty-three x-axis channels on the first EMR sheet 410 and the second EMR sheet 420, the first lines 810 and the second lines 820, which have the number (e.g., nineteen) smaller than twenty-three, may be disposed. In general, twenty-three lines may be required to form twenty-three x-axis channels on the EMR sheet. However, in the present disclosure, twenty-three x-axis channels may be formed on the first EMR sheet 410 and the second EMR sheet 420 by using the nineteen first lines 810 and the nineteen second lines 820.

In the embodiment, in order to form the twenty-three x-axis channels, the nineteen lines (e.g., the first lines 810 in FIG. 8) disposed on the first EMR sheet 410 and the nineteen lines (e.g., the second lines 820 in FIG. 8) disposed on the second EMR sheet 420 may be electrically connected, directly or indirectly, and the x-axis channels may be configured as a single closed loop.

In the embodiment, a line of a first x-axis channel formed on the first EMR sheet 410 and a line of a first x-axis channel formed on the second EMR sheet 420 may be electrically connected, and the first x-axis channels may be configured as a single closed loop while traversing the first EMR sheet 410 and the second EMR sheet 420. For example, like the first x-axis channels, second to twenty-third x-axis channels may be electrically connected and configured as closed loops. In this case, nineteen lines 810 and 820 may be used to form twenty-three x-axis channels. The number of lines 810 and 820, which constitute the x-axis channels, may be reduced, such that the physical sizes of the FPCBs and the number of pins of the connectors may be reduced, which may reduce the physical sizes of the connectors.

Figure 9:
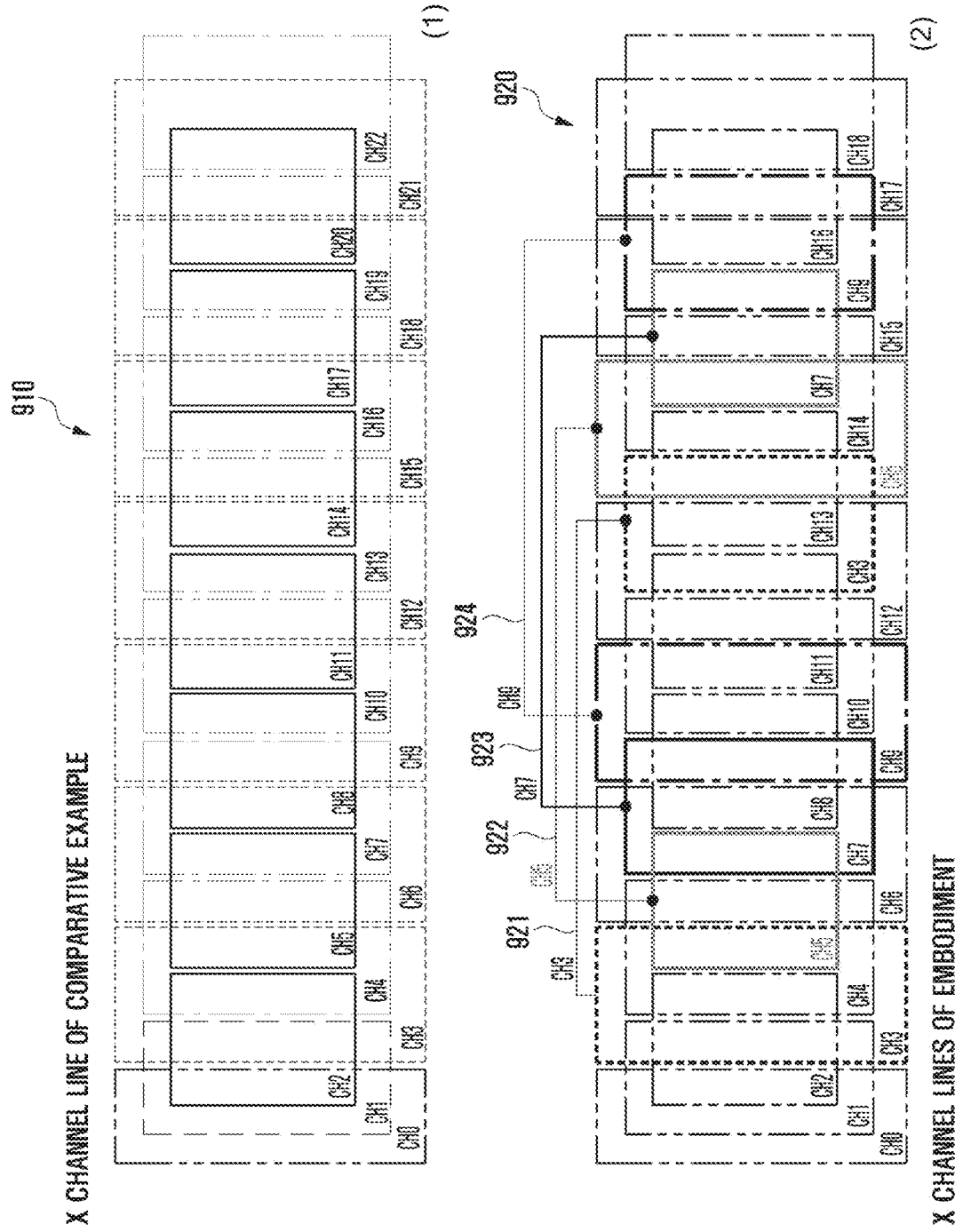
FIGS. 9(1)-(2) are views illustrating an example of a structure in which lines are disposed in a first direction (e.g., an x-axis direction) of a digitizer according to an example embodiment.

FIG. 9 is a view illustrating an example of a structure in which lines are disposed in a first direction (e.g., an x-axis direction) of the digitizer of the present disclosure. With reference to FIG. 9, an example will be described in which the digitizer includes twenty-three x-axis channels.

With reference to FIG. 9, in a digitizer 910 of a comparative example, twenty-three x-axis channels ch0 to ch22 may be formed by separate twenty-three x-axis lines. In contrast, in a digitizer 920 according to various example embodiments, twenty-three x-axis channels may be formed by nineteen x-axis lines by defining some of the x-axis lines as common lines.

In the embodiment, the digitizer 920 according to the example embodiments may include twenty-three x-axis channels, and some of the twenty-three x-axis channels may be common channels formed as common lines.

In the embodiment, the twenty-three x-axis channels may be sequentially arranged on the digitizer 920. In this case, all three continuous channels may be formed as a single line, and one or two channels of the three continuous channels may be common channels formed as common lines. For example, x-axis single channels (e.g., channel 0 (ch0), channel 1 (ch1), channel 2 (ch2), channel 4 (ch4), channel 6 (ch6), channel 8 (ch8), channel 10 (ch10), channel 11 (ch11), channel 12 (ch12), channel 13 (ch13), channel 14 (ch14), channel 15 (ch15), channel 16 (ch16), channel 17 (ch17), and channel 18 (ch18)) formed as single lines may be disposed in the x-axis direction, and x-axis common channels (e.g., channel 3 (ch3) 921, channel 5 (ch5) 922, channel 7 (ch7) 923, and channel 9 (ch9) 924) formed as common lines may be disposed in the x-axis direction.

In the embodiment, the processor (e.g., the processor 120 in FIG. 1) may sense a position of an electronic pen (e.g., an electronic pen 930 in FIG. 10) by using sensing signals (e.g., EMR signals) received from the x-axis channels formed as single lines and the x-axis common channels formed as common lines.

In the embodiment, channel 0 (ch0), channel 1 (ch1), channel 2 (ch2), channel 3 (ch3) 921, channel 4 (ch4), channel 5 (ch5) 922, channel 6 (ch6), channel 7 (ch7) 923, channel 8 (ch8), channel 9 (ch9) 924, channel 10 (ch10), channel 11 (ch11), and channel 12 (ch12) may be disposed sequentially. In this case, channel 3 (ch3) 921, channel 5 (ch5) 922, channel 7 (ch7) 923, and channel 9 (ch9) 924 may be the common channels formed as common lines. Next, channel 3 (ch3) 921, which is the common channel, may be disposed next to channel 12 (ch12), and channel 13 (ch13) may be disposed next to channel 3 (ch3) 921. Next, channel 5 (ch5) 922, which is the common channel, may be disposed next to channel 13 (ch13). Next, channel 14 (ch14) may be disposed next to channel 5 (ch5) 922. Next, channel 7 (ch7) 923, which is the common channel, may be disposed next to channel 14 (ch14). Next, channel 15 (ch15) may be disposed next to channel 7 (ch7) 923. Next, channel 9 (ch9) 924, which is the common channel, may be disposed next to channel 15 (ch15). Next, channel 16 (ch16) may be disposed next to channel 9 (ch9) 924. Next, channel 17 (ch17) may be disposed next to channel 16 (ch16), and channel 18 (ch18) may be disposed next to channel 17 (ch17). As described above, the four channels, e.g., channel 3 (ch3) 921, channel 5 (ch5) 922, channel 7 (ch7) 923, and channel 9 (ch9) 924 may be used as the common channels, such that the total of twenty-three x-axis channels may be formed by the nineteen x-axis lines (e.g., the first lines 810 or the second lines 820 in FIG. 8).

Figure 10:
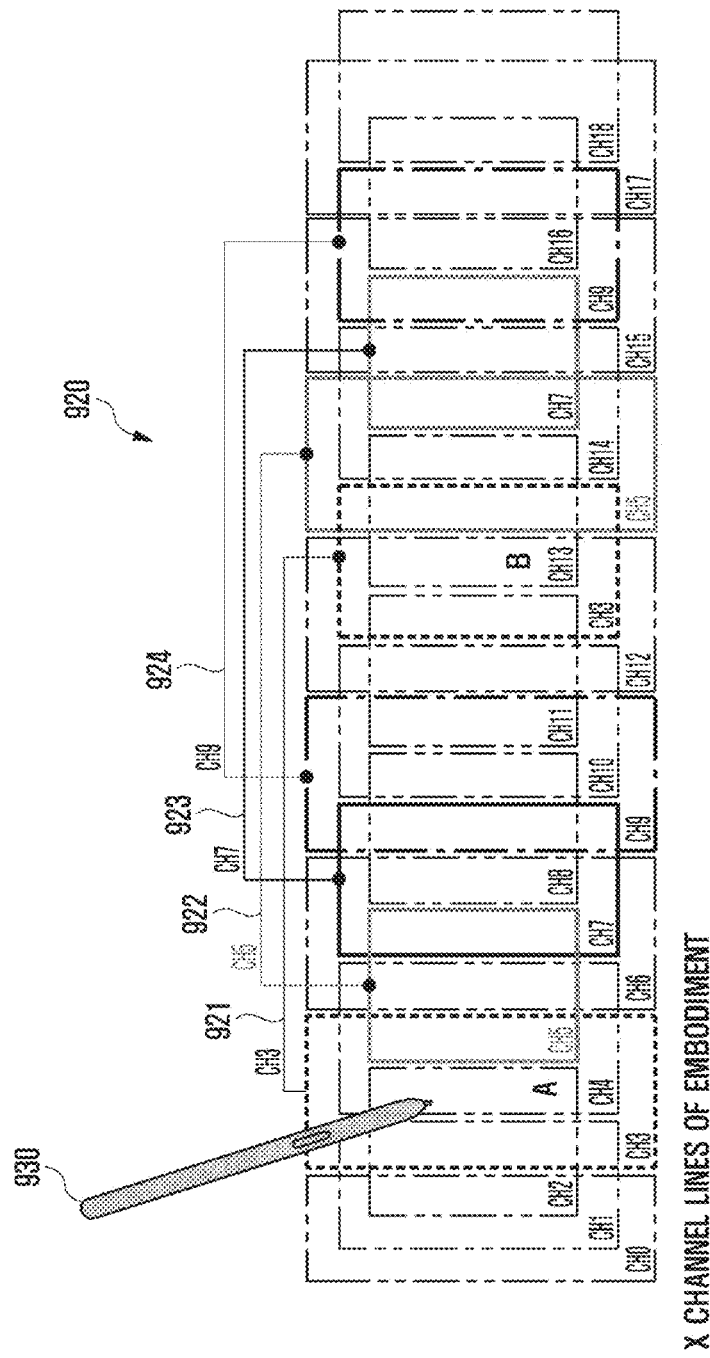
FIGS. 10 and 11 are views illustrating a method of detecting coordinates of an electronic pen (e.g., a stylus pen) in the structure in which the lines are disposed in the first direction (e.g., the x-axis direction) of the digitizer illustrated in FIG. 9, according to an example embodiment.
Figure 11:
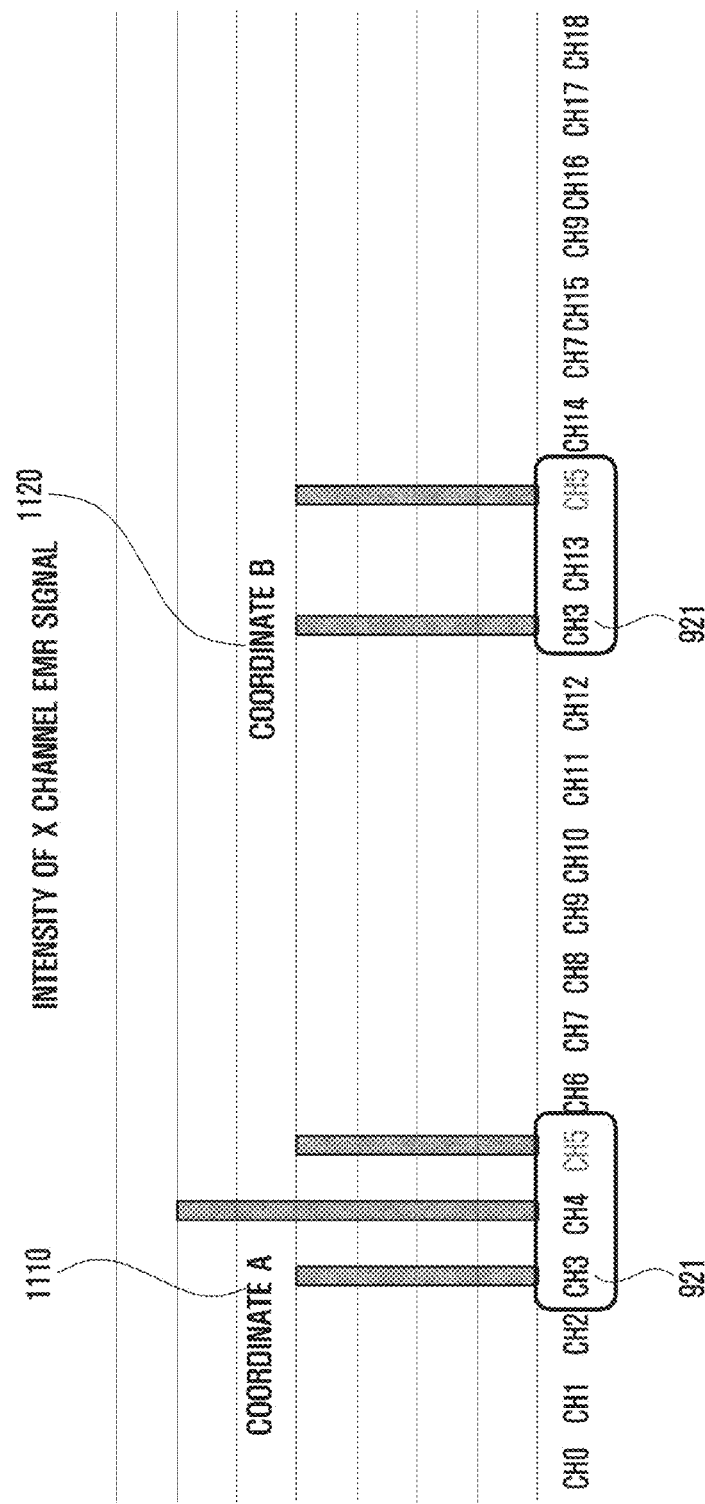

FIGS. 10 and 11 are views illustrating a method of detecting coordinates of the electronic pen (e.g., the stylus pen) in the structure in which the lines are disposed in the first direction (e.g., the x-axis direction) of the digitizer illustrated in FIG. 9.

With reference to FIGS. 10 and 11, the twenty-three x-axis channels may be sequentially arranged on the digitizer 920, and coordinates of the electronic pen 930 may be determined by using the three continuous channels.

In the embodiment, in case that the electronic pen 930 touches a first position (position A) corresponding to channel 4 (ch4), sensing signals 1110 (e.g., EMR signals) of coordinate A may be generated from channel 3 (ch3) 921, which is the common channel, channel 4 (ch4), which is the single channel, and channel 5 (ch5) 922 that is the common channel. For example, the sensing signals 1110 of coordinate A may include the EMR signals generated from channel 3 (ch3) 921, which is the common channel, channel 4 (ch4), which is the single channel, and channel 5 (ch5) 922 that is the common channel.

In the embodiment, in case that the electronic pen 930 touches the first position (position A) corresponding to channel 4 (ch4), sensing signals 1120 (e.g., EMR signals) of coordinate B may also be generated at a second position (position B) at which channel 3 (ch3) 921 and channel 5 (ch5) 922 are disposed in common because channel 3 (ch3) 921 and channel 5 (ch5) 922 are the common channels. However, no sensing signal (e.g., the EMR signal) is generated from channel 13 (ch13) that is the single channel positioned at the second position (position B). For example, the sensing signals 1120 of coordinate B include the EMR signals generated from channel 3 (ch3) 921, which is the common channel, and channel 5 (ch5) 922 that is the common channel. However, the sensing signals 1120 of coordinate B do not include the EMR signal of channel 13 (ch13) that is the single channel.

In the embodiment, the EMR drive IC (e.g., the EMR drive IC 612 in FIG. 7) may receive the sensing signals 1110 (e.g., the EMR signals) of coordinate A generated at the first position (position A) at which channel 3 (ch3) 921, which is the common channel, channel 4 (ch4), which is the single channel, and channel 5 (ch5) 922, which is the common channel, are disposed. Further, the EMR drive IC (e.g., the EMR drive IC 612 in FIG. 7) may receive the sensing signals 1120 (e.g., the EMR signals) of coordinate B generated at the second position (position B) at which channel 3 (ch3) 921, which is the common channel, channel 13 (ch13), which is the single channel, and channel 5 (ch5) 922, which is the common channel, are disposed.

In the embodiment, the EMR drive IC (e.g., the EMR drive IC 612 in FIG. 7) may provide the processor (e.g., the processor 120 in FIG. 1) with the sensing signals 1110 of coordinate A and the sensing signals 1120 of coordinate B.

In the embodiment, the processor (e.g., the processor 120 in FIG. 1) may sense the position of the electronic pen 930 by using the sensing signals (e.g., the EMR signals) received from the x-axis channels formed as the single lines and the x-axis common channels formed as the common lines. For example, the processor (e.g., the processor 120 in FIG. 1) may determine the position touched by the electronic pen 930 by analyzing the sensing signals 1110 (e.g., the EMR signals) of coordinate A and the sensing signals 1120 of coordinate B.

In the embodiment, the processor (e.g., the processor 120 in FIG. 1) may determine the sensing signals 1110 of coordinate A and identify that the sensing signals 1110 of coordinate A include the sensing signals (e.g., the EMR signals) of channel 3 (ch3) 921, which is the common channel, channel 4 (ch4), which is the single channel, and channel 5 (ch5) 922 that is the common channel. In addition, the processor (e.g., the processor 120 in FIG. 1) may determine the sensing signals 1120 (e.g., the EMR signals) of coordinate B and identify that the sensing signals 1120 (e.g., the EMR signals) of coordinate B include the sensing signals (e.g., the EMR signals) of channel 3 (ch3) 921, which is the common channel, and channel 5 (ch5) 922, which is the common channel, but do not include the sensing signal (e.g., the EMR signal) of channel 13 (ch13) that is the single channel. Therefore, the processor (e.g., the processor 120 in FIG. 1) may determine that the position touched by the electronic pen 930 is coordinate A on the basis of the sensing signals 1110 (e.g., the EMR signals) of coordinate A including all the sensing signals (e.g., the EMR signals) of channel 3 (ch3) 921, which is the common channel, channel 4 (ch4), which is the single channel, and channel 5 (ch5) 922 that is the common channel.

The electronic device (e.g., the electronic device 400 in FIGS. 4 and 5 or the electronic device 400 in FIG. 7) according to various example embodiments may form the twenty-three x-axis channels by using the nineteen x-axis lines by forming some of the x-axis lines of the digitizer (e.g., the digitizers 410 and 420 in FIGS. 4 and 7) as the common lines.

The electronic device 400 according to various example embodiments may reduce, by four (e.g., a decrease from twenty-three to nineteen), the number of x-axis lines (e.g., the first lines 810 and the second lines 820 in FIG. 8) for forming the x-axis channels disposed on the first EMR sheet (e.g., the first EMR sheet 410 in FIG. 8) and the second EMR sheet (e.g., the second EMR sheet 420 in FIG. 8), thereby reducing the physical areas of the first FPCB 632, the second FPCB 642, and the third FPCB 652.

In addition, the electronic device 400 according to various example embodiments may reduce, by four (e.g., a decrease from twenty-three to nineteen), the number of x-axis lines (e.g., the first lines 810 and the second lines 820 in FIG. 8) for forming the x-axis channels disposed on the first EMR sheet (e.g., the first EMR sheet 410 in FIG. 8) and the second EMR sheet (e.g., the second EMR sheet 420 in FIG. 8), thereby reducing, by four, the number of pins of the connector 634 of the first FPCB 632, the connector 644 of the second FPCB 642, and the connector 654 of the third FPCB 652, and reducing the physical sizes of the connector 634 of the first FPCB 632, the connector 644 of the second FPCB 642, and the connector 654 of the third FPCB 652.

Figure 12:
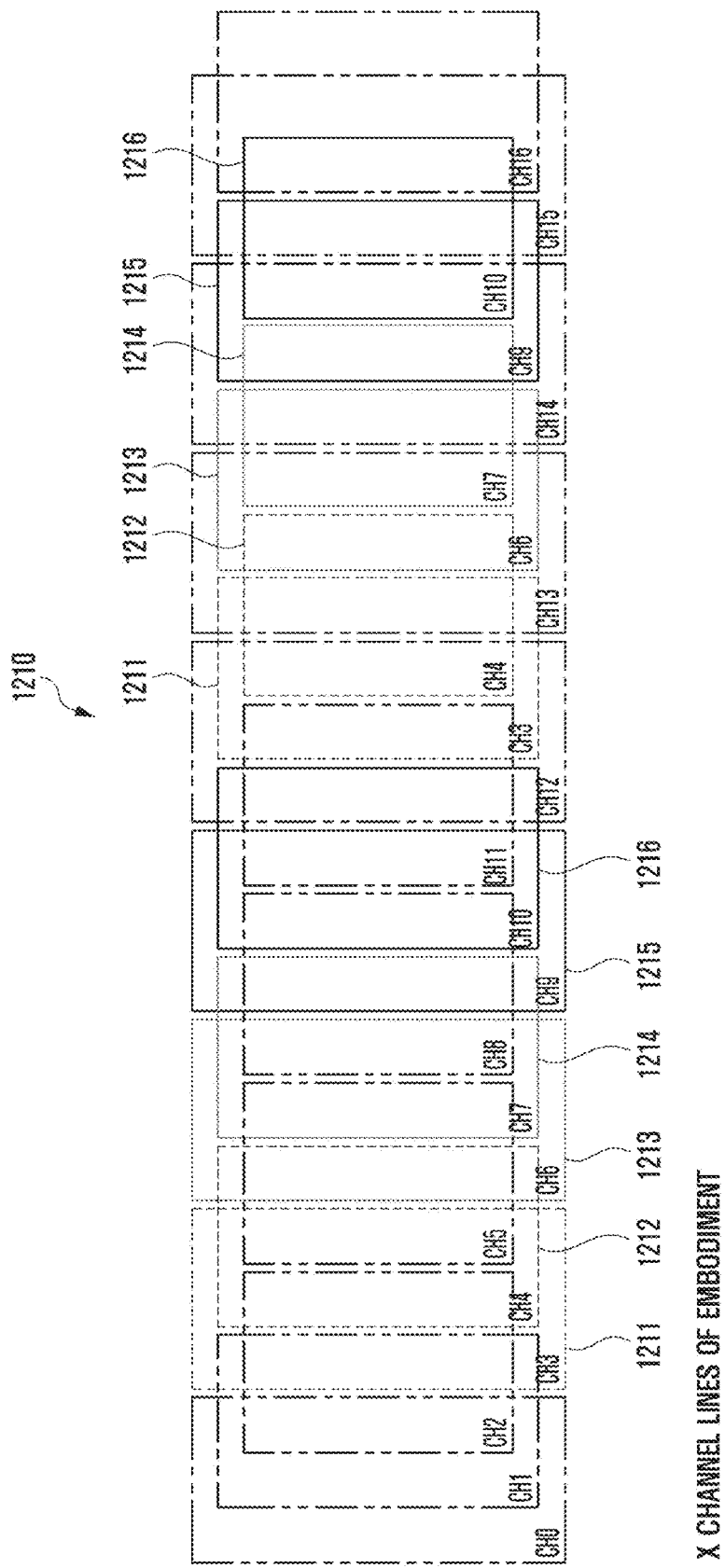
FIG. 12 is a view illustrating an example of the structure in which the lines are disposed in the first direction (e.g., the x-axis direction) of the digitizer, according to an example embodiment.

FIG. 12 is a view illustrating an example of the structure in which the lines are disposed in the first direction (e.g., the x-axis direction) of the digitizer of the present disclosure.

With reference to FIG. 12, in the digitizer (e.g., the digitizer 910 in FIG. 9) of the comparative example, the twenty-three x-axis channels ch0 to ch22 may be formed by the separate twenty-three x-axis lines. In contrast, in a digitizer 1210 according to various example embodiments, the twenty-three x-axis channels may be formed by seventeen x-axis lines by defining some of the x-axis lines as common lines.

In the embodiment, the digitizer 1210 according to the example embodiments may include the twenty-three x-axis channels, and some of the twenty-three x-axis channels may be common channels.

In the embodiment, the twenty-three x-axis channels may be sequentially arranged on the digitizer 1210. In this case, all three continuous channels may be formed as a single line, and one or two channels of the three continuous channels may be common channels formed as common lines. For example, the x-axis single channels formed as single lines and the x-axis common channels formed as common lines may be disposed in the x-axis direction.

In the embodiment, the processor (e.g., the processor 120 in FIG. 1) may sense a position of an electronic pen (e.g., an electronic pen 1220 in FIG. 13) by using sensing signals (e.g., EMR signals) received from the x-axis channels formed as single lines and the x-axis common channels formed as common lines.

In the embodiment, channel 0 (ch0), channel 1 (ch1), channel 2 (ch2), channel 3 (ch3) 1211, channel 4 (ch4) 1212, channel 5 (ch5), channel 6 (ch6) 1213, channel 7 (ch7) 1214, channel 8 (ch8), channel 9 (ch9) 1215, channel 10 (ch10) 1216, channel 11 (ch11), and channel 12 (ch12) may be disposed sequentially. In this case, channel 3 (ch3) 1211, channel 4 (ch4) 1212, channel 6 (ch6) 1213, channel 7 (ch7) 1214, channel 9 (ch9) 1215, and channel 10 (ch10) 1216 may be the common channels formed as common lines. Next, channel 3 (ch3) 1211, which is the common channel, may be disposed next to channel 12 (ch12), and channel 4 (ch14) 1212, which is the common channel, may be disposed next to or overlapping channel 3 (ch3) 921. Next, channel 13 (ch13) may be disposed next to channel 4 (ch14) 1212. Next, channel 6 (ch6) 1213, which is the common channel, may be disposed next to channel 13 (ch13). Next, channel 7 (ch7) 1214, which is the common channel, may be disposed next to channel 6 (ch6) 1213. Next, channel 14 (ch14) may be disposed next to channel 7 (ch7) 1214. Next, channel 9 (ch9) 1215, which is the common channel, may be disposed next to channel 14 (ch14). Next, channel 10 (ch10) 1216, which is the common channel, may be disposed next to channel 9 (ch9) 1215. Next, channel 15 (ch15) may be disposed next to channel 10 (ch10) 1216. Next, channel 16 (ch16) may be disposed next to channel 15 (ch15). As described above, the six channels, e.g., channel 3 (ch3) 1211, channel 4 (ch4) 1212, channel 6 (ch6) 1213, channel 7 (ch7) 1214, channel 9 (ch9) 1215, and channel 10 (1216) may be used as the common channels, such that the total of twenty-three x-axis channels may be formed by the seventeen x-axis lines.

Figure 13:
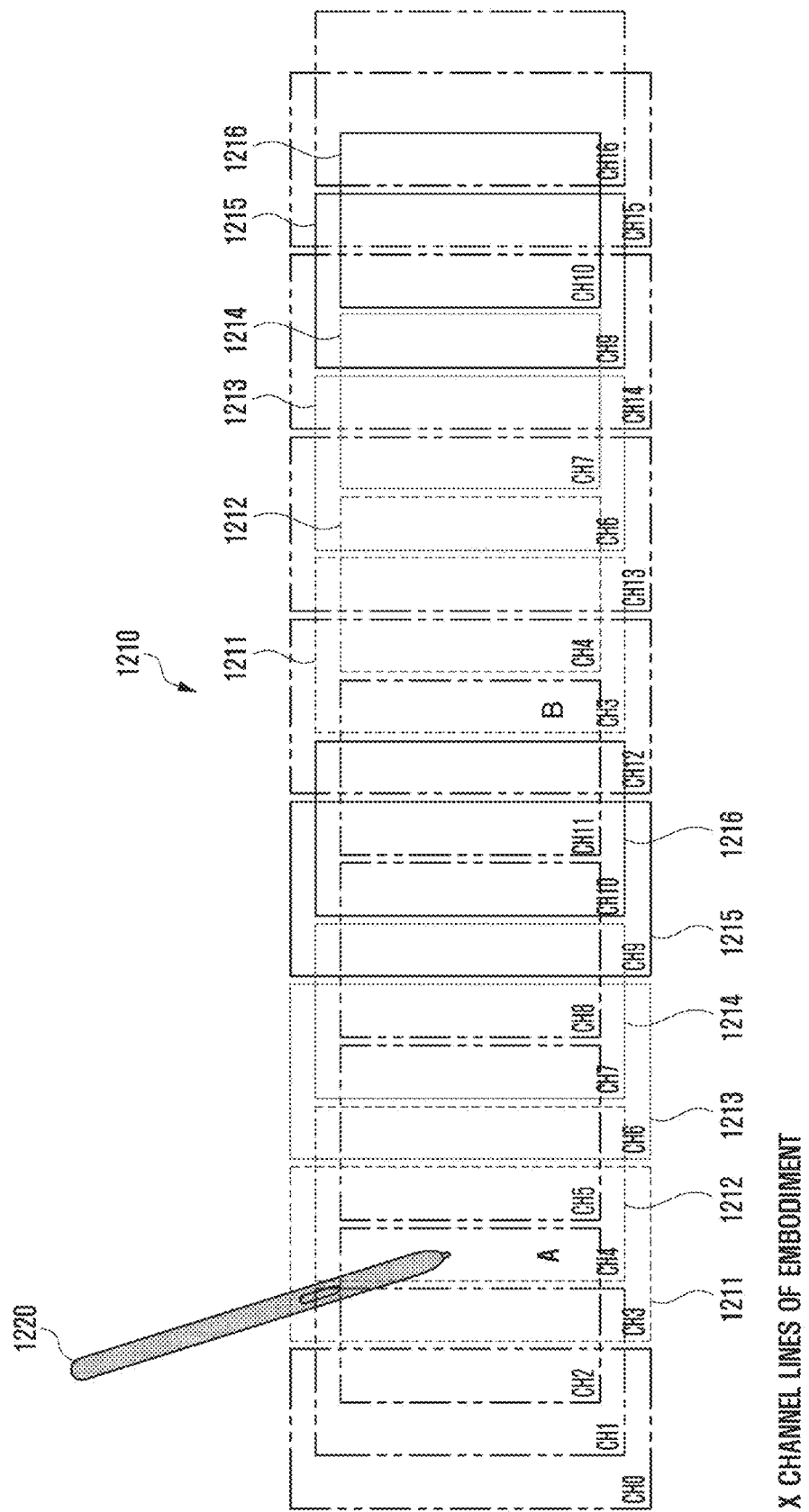
FIGS. 13 and 14 are views illustrating a method of detecting coordinates of the electronic pen (e.g., the stylus pen) in the structure in which the lines are disposed in the first direction (e.g., the x-axis direction) of the digitizer illustrated in FIG. 12, according to an example embodiment.
Figure 14:
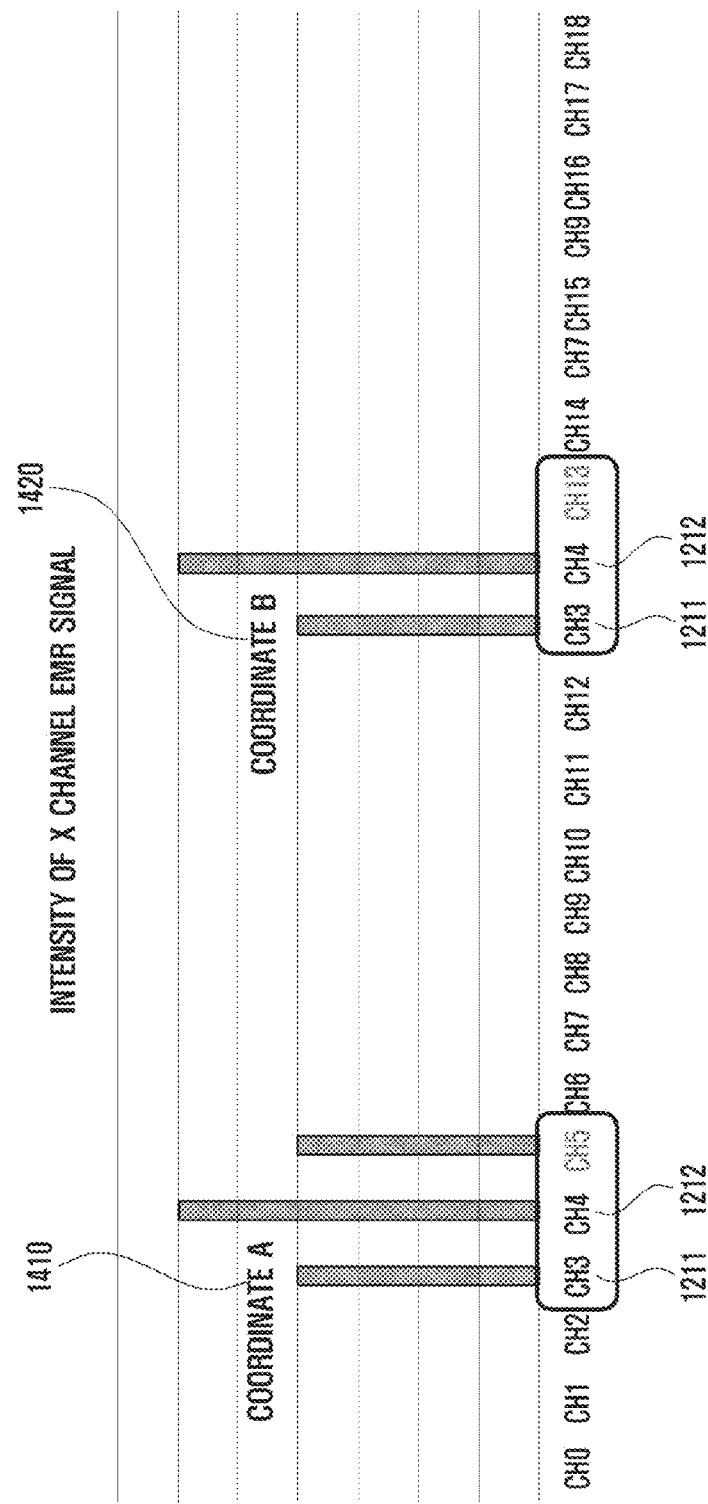

FIGS. 13 and 14 are views illustrating a method of detecting coordinates of the electronic pen (e.g., the stylus pen) in the structure in which the lines are disposed in the first direction (e.g., the x-axis direction) of the digitizer illustrated in FIG. 12.

With reference to FIGS. 13 and 14, the twenty-three x-axis channels may be sequentially arranged on the digitizer 1210, and coordinates of the electronic pen 1220 may be determined by using the three continuous channels.

In the embodiment, in case that the electronic pen 1220 touches the first position (position A) corresponding to channel 4 (ch4) 1212, sensing signals 1410 (e.g., EMR signals) of coordinate A may be generated from channel 3 (ch3) 1211, which is the common channel, channel 4 (ch4) 1212, which is the common channel, and channel 5 (ch5) that is the single channel. For example, the sensing signals 1410 of coordinate A may include the EMR signals generated from channel 3 (ch3) 1211, which is the common channel, channel 4 (ch4) 1212, which is the common channel, and channel 5 (ch5) that is the single channel.

In the embodiment, in case that the electronic pen 1220 touches the first position (position A) corresponding to channel 4 (ch4) 1212, sensing signals 1420 (e.g., EMR signals) of coordinate B may also be generated at the second position (position B) at which channel 3 (ch3) 1211 and channel 4 (ch4) 1212 are disposed in common because channel 3 (ch3) 1211 and channel 4 (ch4) 1212 are the common channels. However, no sensing signal (e.g., the EMR signal) is generated from channel 13 (ch13). For example, the sensing signals 1420 of coordinate B include the EMR signals generated from channel 3 (ch3) 1211, which is the common channel, and channel 4 (ch4) 1212 that is the common channel. However, the sensing signals 1420 of coordinate B do not include the EMR signal of channel 13 (ch13) that is the single channel.

In the embodiment, the EMR drive IC (e.g., the EMR drive IC 612 in FIG. 7) may receive the sensing signals 1410 (e.g., the EMR signals) of coordinate A generated at the first position (position A) at which channel 3 (ch3) 1211, which is the common channel, channel 4 (ch4) 1212, which is the common channel, and channel 5 (ch5), which is the single channel, are disposed. Further, the EMR drive IC (e.g., the EMR drive IC 612 in FIG. 7) may receive the sensing signals 1420 (e.g., the EMR signals) of coordinate B generated at the second position (position B) at which channel 3 (ch3) 1211, which is the common channel, channel 4 (ch4) 1212, which is the common channel, and channel 13 (ch13), which is the single channel, are disposed.

In the embodiment, the EMR drive IC (e.g., the EMR drive IC 612 in FIG. 7) may provide the processor (e.g., the processor 120 in FIG. 1) with the sensing signals 1410 of coordinate A and the sensing signals 1420 of coordinate B.

In the embodiment, the processor (e.g., the processor 120 in FIG. 1) may sense the position of the electronic pen 1220 by using the sensing signals (e.g., the EMR signals) received from the x-axis channels formed as the single lines and the x-axis common channels formed as the common lines. For example, the processor (e.g., the processor 120 in FIG. 1) may determine the position touched by the electronic pen 1220 by analyzing the sensing signals 1410 (e.g., the EMR signals) of coordinate A and the sensing signals 1420 of coordinate B.

In the embodiment, the processor (e.g., the processor 120 in FIG. 1) may determine the sensing signals 1410 of coordinate A and identify that the sensing signals 1410 of coordinate A include the sensing signals (e.g., the EMR signals) of channel 3 (ch3) 1211, which is the common channel, channel 4 (ch4) 1212, which is the common channel, and channel 5 (ch5) that is the single channel. In addition, the processor (e.g., the processor 120 in FIG. 1) may determine the sensing signals 1420 (e.g., the EMR signals) of coordinate B and identify that the sensing signals 1420 (e.g., the EMR signals) of coordinate B include the sensing signals (e.g., the EMR signals) of channel 3 (ch3) 1211, which is the common channel, and channel 4 (ch4) 1212, which is the common channel, but do not include the sensing signal (e.g., the EMR signal) of channel 13 (ch13) that is the single channel. Therefore, the processor (e.g., the processor 120 in FIG. 1) may determine that the position touched by the electronic pen 1220 is coordinate A on the basis of the sensing signals 1410 (e.g., the EMR signals) of coordinate A including all the sensing signals (e.g., the EMR signals) of channel 3 (ch3) 1211, which is the common channel, channel 4 (ch4) 1212, which is the common channel, and channel 5 (ch5) that is the single channel.

The electronic device (e.g., the electronic device 400 in FIGS. 4 and 5 or the electronic device 400 in FIG. 7) according to various example embodiments may form the twenty-three x-axis channels by using the seventeen x-axis lines by forming some of the x-axis lines of the digitizer (e.g., the digitizers 410 and 420 in FIGS. 4 and 7) as the common lines.

The electronic device 400 according to various example embodiments may reduce, by six (e.g., a decrease from twenty-three to seventeen), the number of x-axis lines (e.g., the first lines 810 and the second lines 820 in FIG. 8) for forming the x-axis channels disposed on the first EMR sheet (e.g., the first EMR sheet 410 in FIG. 8) and the second EMR sheet (e.g., the second EMR sheet 420 in FIG. 8), thereby reducing the physical areas of the first FPCB 632, the second FPCB 642, and the third FPCB 652.

In addition, the electronic device 400 according to various example embodiments may reduce, by six (e.g., a decrease from twenty-three to seventeen), the number of x-axis lines (e.g., the first lines 810 and the second lines 820 in FIG. 8) for forming the x-axis channels disposed on the first EMR sheet (e.g., the first EMR sheet 410 in FIG. 8) and the second EMR sheet (e.g., the second EMR sheet 420 in FIG. 8), thereby reducing, by six, the number of pins of the connector 634 of the first FPCB 632, the connector 644 of the second FPCB 642, and the connector (e.g., the connector 654 in FIG. 6) of the third FPCB (e.g., the third FPCB 652 in FIG. 6), and reducing the physical sizes of the connector 634 of the first FPCB 632, the connector 644 of the second FPCB 642, and the connector 654 of the third FPCB 652.

Figure 15:
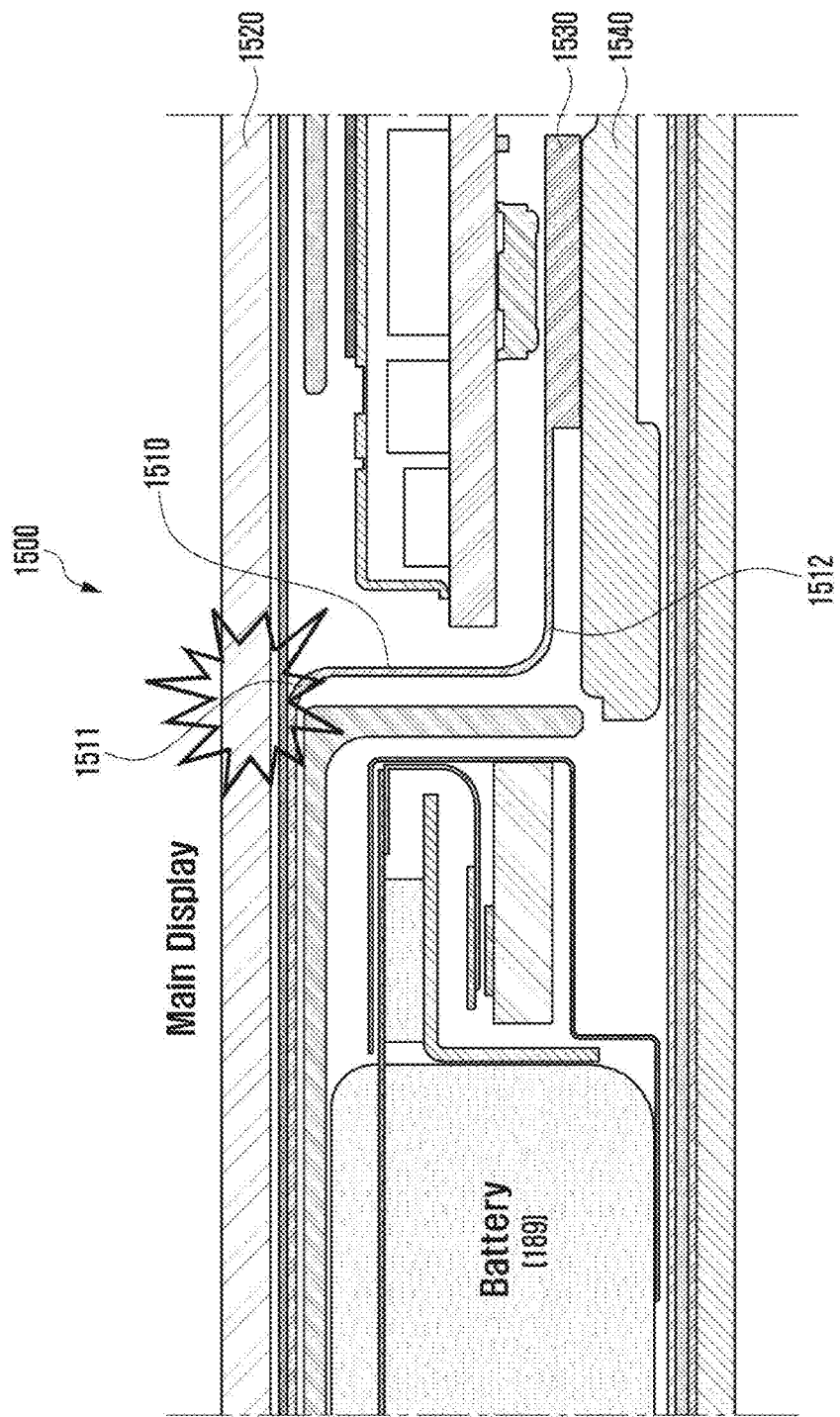
FIG. 15 is a view illustrating a state in which a degree to which a display is pushed in a z-axis direction is reduced as the number of connector pins of a first FPCB structure and the number of connector pins of a second FPCB structure are reduced, according to an example embodiment.

FIG. 15 is a view illustrating a state in which a degree to which a display is pushed in the z-axis direction is reduced as the number of connector pins of the first FPCB structure and the number of connector pins of the second FPCB structure are reduced.

With reference to FIG. 15, a part of an FPCB 1510 of a digitizer (e.g., the digitizers 410 and 420 in FIGS. 7 and 8) may be disposed below a display 1510 of an electronic device 1500. The FPCB 1510 of the digitizer (e.g., the digitizers 410 and 420 in FIGS. 7 and 8) may be electrically connected to a printed circuit board 1540 through a connector 1530.

In the embodiment, the FPCB 1510 of the digitizer (e.g., the digitizers 410 and 420 in FIGS. 7 and 8) may be disposed to be bent twice (1511, 1512) in a vertical direction (e.g., the z-axis direction in FIGS. 3 and 4). The FPCB 1510 is bent (1511) at a portion adjacent to a lower portion of a display 1520. A force for restoring the FPCB 1510 to an original shape may be applied to push the display 1520 upward toward the front surface (e.g., the upper side).

The electronic device 1500 according to various example embodiments may reduce the number of x-axis lines (e.g., the first lines 810 and the second lines 820 in FIG. 8) for forming the x-axis channels disposed on the first EMR sheet (e.g., the first EMR sheet 410 in FIG. 8) and the second EMR sheet (e.g., the second EMR sheet 420 in FIG. 8), thereby reducing the number of pins of the connector 634 (e.g., the connector 634 in FIG. 4) of the first FPCB 632 (e.g., the first FPCB 632 in FIG. 4), the connector 644 (e.g., the connector 644 in FIG. 4) of the second FPCB 642 (e.g., the second FPCB 642 in FIG. 4), and the connector (e.g., the connector 654 in FIG. 6) of the third FPCB (e.g., the third FPCB 652 in FIG. 6), and reducing the physical sizes of the connectors 634, 644, and 654. Therefore, it is possible to improve the surface quality of the display by reducing pressure applied by the FPCB 1510 to push the display 1520 upward toward the front surface (e.g., the upper side).

Figure 16:
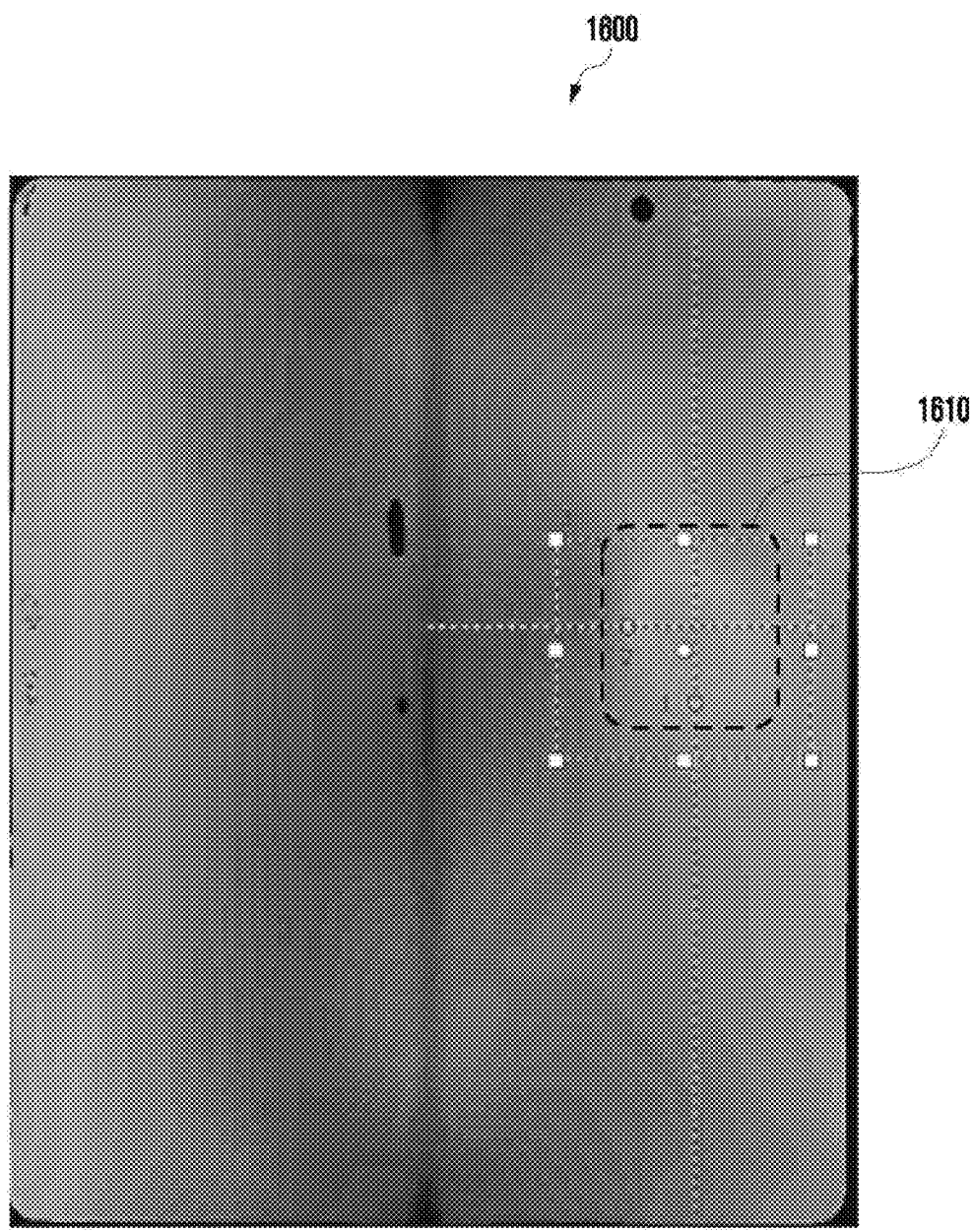
FIG. 16 is a view illustrating a state in which surface quality of a display of an electronic device of a comparative example deteriorates as the display is pushed in the z-axis direction, according to an example embodiment.
Figure 17:
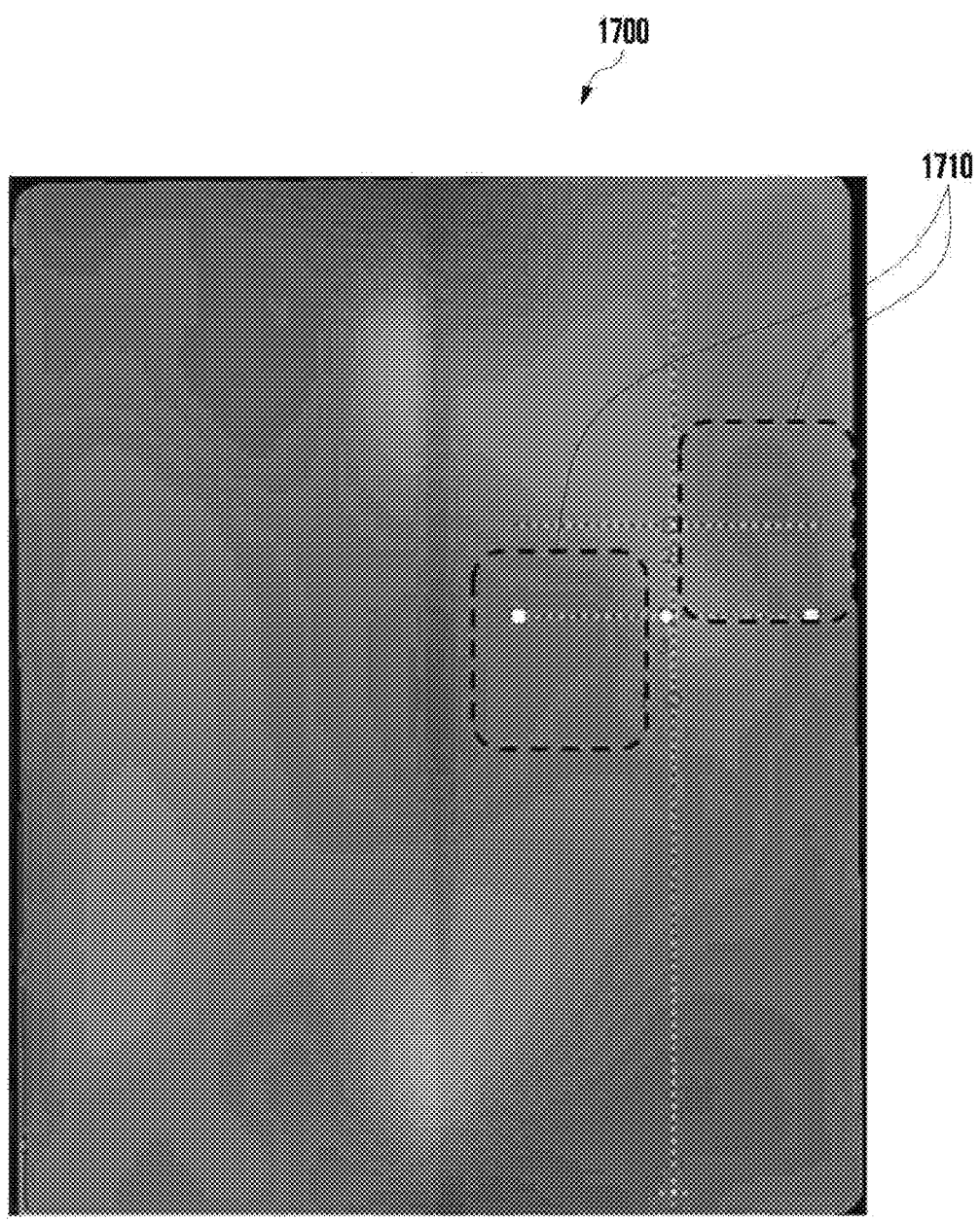
FIG. 17 is a view illustrating a state in which a degree to which a display of an electronic device according to various example embodiments is pushed in the z-axis direction is reduced, such that surface quality of the display is improved.

FIG. 16 is a view illustrating a state in which surface quality of a display of an electronic device of a comparative example deteriorates as the display is pushed in the z-axis direction. FIG. 17 is a view illustrating a state in which a degree to which the display of the electronic device according to various example embodiments is pushed in the z-axis direction is reduced, such that surface quality of the display is improved.

With reference to FIGS. 15, 16, and 17, in an electronic device 1600 of a comparative example, a display 1610 is pushed upward toward the front surface (e.g., upper side) at a portion 1511 where the FPCB 1510 is bent, which may degrade surface quality of the display 1610. In contrast, in an electronic device 1700 according to various example embodiments, pressure, which pushes a display 1610 upward at a portion 1511 where the FPCB 1510 is bent, may be reduced, which may improve surface quality of a display 1710.

An electronic device (e.g., the electronic device 100 in FIG. 1, the electronic device 200 in FIGS. 2A and 2B, the electronic device 200 in FIGS. 3A and 3, or the electronic device 400 in FIGS. 4 and 7) according to various example embodiments may include a first housing (e.g., the first housing structure 403 in FIG. 4), a second housing (e.g., the second housing structure 404 in FIG. 4) foldably coupled to the first housing 403 via a hinge device, a display (e.g., the display 710 in FIG. 7) disposed to be supported by the first housing 403 and the second housing 404, digitizers (e.g., the digitizers 410 and 420 in FIGS. 4 and 5) disposed below the display 710, a first printed circuit board (e.g., the first printed circuit board 610 in FIGS. 4 and 6) disposed in a first internal space of the first housing 403 and electrically connected, directly or indirectly, to the digitizers 410 and 420, a second printed circuit board (e.g., the second printed circuit board 620 in FIGS. 4 and 6) disposed in a second internal space of the second housing 404 and electrically connected, directly or indirectly, to the digitizers 410 and 420, a third FPCB structure (e.g., the third FPCB structure 650 in FIG. 6) configured to electrically connect the first printed circuit board 610 and the second printed circuit board 620, and a processor (e.g., the processor 120 in FIG. 1) configured to detect a coordinate of an electronic pen (e.g., the electronic pen, e.g., stylus, 930 in FIG. 10) adjacent to the digitizers 410 and 420. The digitizers 410 and 420 may each include a first electromagnetic resonance (EMR) sheet (e.g., the first EMR sheet 410 in FIG. 4) disposed in the first internal space of the first housing 403 and including a first flexible printed circuit board (FPCB) structure (e.g., the first FPCB structure 630 in FIG. 6), and a second EMR sheet (e.g., the second EMR sheet 420 in FIG. 4) disposed in the internal space of the second housing 404 and including a second FPCB structure (e.g., the second FPCB structure 640 in FIG. 6). The digitizers 410 and 420 may each include a plurality of x-axis channels and a plurality of y-axis channels orthogonal to the plurality of x-axis channels, and the plurality of x-axis channels may include single channels formed as single lines and common channels formed as common lines.

According to the embodiment, the plurality of x-axis channels may include the single channels having three continuous channels all formed as the single lines.

According to the embodiment, the plurality of x-axis channels may include the common channels having one or two channels formed as the common lines among the three continuous channels.

According to the embodiment, the digitizers 410 and 420 may be configured such that a sum of the single lines and the common lines is smaller in number than the plurality of x-axis channels.

According to the embodiment, the first FPCB structure 630 may include a first FPCB (e.g., the first FPCB 632 in FIG. 4) and a first connector (e.g., the first connector 634 in FIG. 4) configured to electrically connect the first EMR sheet 410 and the first printed circuit board 610. The first FPCB 632 may include signal lines equal in number to a sum of the single lines and the common lines.

According to the embodiment, the first connector 634 may include connector pins equal in number to a sum of the single lines and the common lines.

According to the embodiment, the second FPCB structure 640 may include a second FPCB (e.g., the second FPCB 642 in FIG. 4) and a second connector (e.g., the second connector 644 in FIG. 4) configured to electrically connect the second EMR sheet 420 and the second printed circuit board 620. The second FPCB 642 may include signal lines equal in number to a sum of the single lines and the common lines.

According to the embodiment, the second connector 644 may include connector pins equal in number to a sum of the single lines and the common lines.

According to the embodiment, the third FPCB structure 650 may include a third FPCB (e.g., the third FPCB 652 in FIG. 4) and a third connector (e.g., the third connector 654 in FIG. 4) configured to electrically connect the first printed circuit board 610 and the second printed circuit board 620. The third FPCB 652 may include signal lines equal in number to a sum of the single lines and the common lines.

According to the embodiment, the third connector 654 may include connector pins equal in number to a sum of the single lines and the common lines.

According to the embodiment, the digitizers 410 and 420 may include twenty-three x-axis channels formed by nineteen lines.

According to the embodiment, the twenty-three x-axis channels may include four pairs of common channels and fifteen single channels.

According to the embodiment, the digitizers 410 and 420 may include twenty-three x-axis channels formed by seventeen lines.

According to the embodiment, the twenty-three x-axis channels may include six pairs of common channels and eleven single channels.

A method of operating an electronic device 100, 200, or 400 according to various example embodiments is a method of operating the electronic device 100, 200, or 400 including the digitizers 410 and 420, the digitizers 410 and 420 may include a plurality of x-axis channels and a plurality of y-axis channels orthogonal to the plurality of x-axis channels, and the plurality of x-axis channels may include single channels formed as single lines and common channels formed as common lines. First electromagnetic resonance (EMR) signals of three first x-axis channels disposed at a first position may be received. Second EMR signals of three second x-axis channels disposed at a second position may be received. The x-axis channels of the first EMR signals and the second EMR signals may be compared, and a position, at which an electronic pen 930 is adjacent to the digitizers 410 and 420, may be determined.

According to the embodiment, the digitizers 410 and 420 may include twenty-three x-axis channels formed by nineteen lines. The twenty-three x-axis channels may include four pairs of common channels and fifteen single channels. A position touched by the electronic pen 930 may be determined on the basis of EMR signals of the four pairs of common channels and the fifteen single channels.

According to the embodiment, the digitizers 410 and 420 may include twenty-three x-axis channels formed by seventeen lines. The twenty-three x-axis channels may include six pairs of common channels and eleven single channels. A position touched by the electronic pen 930 may be determined on the basis of EMR signals of the six pairs of common channels and the eleven single channels.

According to the embodiment, the first position may be determined as a position touched by the electronic pen 930 when the first EMR signals include all EMR signals of the three first x-axis channels and the second EMR signals do not include all EMR signals of the three second x-axis channels.

According to the embodiment, the first EMR signals may include an EMR signal of at least one single channel and an EMR signal of at least one common channel.

According to the embodiment, the second EMR signal may include only an EMR signal of at least one common channel.

While the specific embodiments have been described specifically to some extent, it should be understood that the foregoing description is not restrictive. In addition, the embodiments described herein may be modified by omitting, adding, substituting, or changing particular elements without departing from the scope of the document.

While the present disclosure has been illustrated and described with reference to various embodiments, it will be understood by those skilled in the art that various changes in shape and detail may be made without departing from the spirit and scope of the disclosure. The scope of the present disclosure is defined by the appended claims and equivalents thereof. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
   a first housing;
   a second housing foldably coupled to the first housing via at least a hinge device which comprises a hinge;
   a display supported by at least the first housing and the second housing; and
   a digitizer disposed below at least the display and comprising a first electromagnetic resonance (EMR) sheet disposed at least partially in a first internal space of the first housing and comprising a first flexible printed circuit board (FPCB) structure, and a second EMR sheet disposed at least partially in a second internal space of the second housing and comprising a second FPCB structure;
   a first printed circuit board disposed at least partially in the first internal space and electrically connected to the digitizer;

a second printed circuit board disposed at least partially in the second internal space and electrically connected to the digitizer;

a third FPCB structure configured to electrically connect the first printed circuit board and the second printed circuit board; and at least one processor, comprising processing circuitry, configured to detect a coordinate of an electronic pen adjacent to the digitizer, wherein the digitizer further comprises:

a plurality of x-axis channels; and a plurality of y-axis channels substantially orthogonal to the plurality of x-axis channels, and wherein the plurality of x-axis channels comprises: single channels formed as single lines; and common channels formed as common lines.

2. The electronic device of claim 1, wherein the plurality of x-axis channels comprises the single channels having three continuous channels all formed as the single lines.

3. The electronic device of claim 2, wherein the plurality of x-axis channels comprises the common channels having one or two channels formed as the common lines among the three continuous channels.

4. The electronic device of claim 1, wherein the digitizer is configured such that a sum of the single lines and the common lines is smaller in number than the plurality of x-axis channels.

5. The electronic device of claim 1, wherein the first FPCB structure comprises a first FPCB and a first connector configured to electrically connect the first EMR sheet and the first printed circuit board, and wherein the first FPCB comprises signal lines equal in number to a sum of the single lines and the common lines.

6. The electronic device of claim 5, wherein the first connector comprises connector pins equal in number to a sum of the single lines and the common lines.

7. The electronic device of claim 5, wherein the second FPCB structure comprises a second FPCB and a second connector configured to electrically connect the second EMR sheet and the second printed circuit board, and wherein the second FPCB comprises signal lines equal in number to a sum of the single lines and the common lines.

8. The electronic device of claim 7, wherein the second connector comprises connector pins equal in number to a sum of the single lines and the common lines.

9. The electronic device of claim 7, wherein the third FPCB structure comprises a third FPCB and a third connector configured to electrically connect the first printed circuit board and the second printed circuit board, and wherein the third FPCB comprises signal lines equal in number to a sum of the single lines and the common lines.

10. The electronic device of claim 9, wherein the third connector comprises connector pins equal in number to a sum of the single lines and the common lines.

11. The electronic device of claim 1, wherein the digitizer comprises twenty-three x-axis channels formed by nineteen lines.

12. The electronic device of claim 11, wherein the twenty-three x-axis channels comprise four pairs of common channels and fifteen single channels.

13. The electronic device of claim 1, wherein the digitizer comprises twenty-three x-axis channels formed by seventeen lines.

14. The electronic device of claim 13, wherein the twenty-three x-axis channels comprise six pairs of common channels and eleven single channels.

15. A method of operating an electronic device comprising a digitizer that comprises a plurality of x-axis channels and a plurality of y-axis channels orthogonal to the plurality of x-axis channels, the plurality of x-axis channels comprising single channels formed as single lines and common channels formed as common lines, the method comprising:

receiving first electromagnetic resonance (EMR) signals of three first x-axis channels disposed at a first position;

receiving second EMR signals of three second x-axis channels disposed at a second position; and comparing the x-axis channels of the first EMR signals and the second EMR signals and determining a position of an electronic pen proximate the digitizer.

16. The method of claim 15, wherein the digitizer comprises twenty-three x-axis channels formed by nineteen lines, the twenty-three x-axis channels comprise four pairs of common channels and fifteen single channels, and a position touched by the electronic pen is determined based on the EMR signals of the four pairs of common channels and the fifteen single channels.

17. The method of claim 15, wherein the digitizer comprises twenty-three x-axis channels formed by seventeen lines, the twenty-three x-axis channels comprise six pairs of common channels and eleven single channels, and a position touched by the electronic pen is determined based on the EMR signals of the six pairs of common channels and the eleven single channels.

18. The method of claim 15, wherein a first position is determined as a position touched by the electronic pen when the first EMR signals comprise all EMR signals of the three first x-axis channels and the second EMR signals do not comprise all EMR signals of the three second x-axis channels.

19. The method of claim 15, wherein the first EMR signals comprise an EMR signal of at least one single channel and an EMR signal of at least one common channel.

20. The method of claim 15, wherein the second EMR signals comprise only an EMR signal of at least one common channel.

* * * * *